United States Patent
Chung et al.

(10) Patent No.: US 11,283,401 B2
(45) Date of Patent: Mar. 22, 2022

(54) SYSTEM AND METHOD FOR DETERMINING A STATE OF A PHOTOVOLTAIC PANEL

(71) Applicant: City University of Hong Kong, Kowloon (HK)

(72) Inventors: Shu Hung Henry Chung, Mid-Levels (HK); Martin Garaj, Bratislava (SK); Yiwen Hong, Choi Hung (HK)

(73) Assignee: City University of Hong Kong, Kowloon (HK)

( * ) Notice: Subject to any disclaimer, the term of this patent is extended or adjusted under 35 U.S.C. 154(b) by 65 days.

(21) Appl. No.: 16/125,892

(22) Filed: Sep. 10, 2018

(65) Prior Publication Data

US 2020/0083841 A1    Mar. 12, 2020

(51) Int. Cl.
*H02S 50/10* (2014.01)

(52) U.S. Cl.
CPC .................................... *H02S 50/10* (2014.12)

(58) Field of Classification Search
CPC ................................ H02S 50/10; H02S 50/00
USPC .................................................. 324/761.01
See application file for complete search history.

(56) References Cited

U.S. PATENT DOCUMENTS

| | | | |
|---|---|---|---|
| 2008/0306700 A1* | 12/2008 | Kawam | H01L 31/02021 702/64 |
| 2010/0237836 A1* | 9/2010 | Fahrenbruch | H02M 3/1582 323/223 |
| 2013/0088252 A1* | 4/2013 | Brabetz | G01R 31/026 324/761.01 |
| 2015/0084663 A1* | 3/2015 | Wirsing | H02S 50/00 324/761.01 |
| 2015/0144176 A1* | 5/2015 | Chang | H02S 50/15 136/244 |
| 2016/0294189 A1* | 10/2016 | Uno | G05F 1/67 |
| 2017/0201212 A1* | 7/2017 | Oomiya | H02S 50/10 |
| 2018/0026474 A1* | 1/2018 | Takahashi | H02S 40/38 320/101 |
| 2018/0097354 A1* | 4/2018 | Yoscovich | H02S 50/00 |

* cited by examiner

*Primary Examiner* — Jeff W Natalini
(74) *Attorney, Agent, or Firm* — Renner Kenner Greieve Bobak Taylor & Weber

(57) ABSTRACT

A system for determining a state of a photovoltaic panel. The system includes a data acquisition device having a circuit and a communication module. The circuit is arranged to transmit excitation signals to a photovoltaic panel and detect response signals generated by the photovoltaic panel in response to the excitation signal, during normal operation of the photovoltaic panel. The communication module is arranged to communicate the response signals to a control device for analysis and determination of a state of the photovoltaic panel.

26 Claims, 16 Drawing Sheets

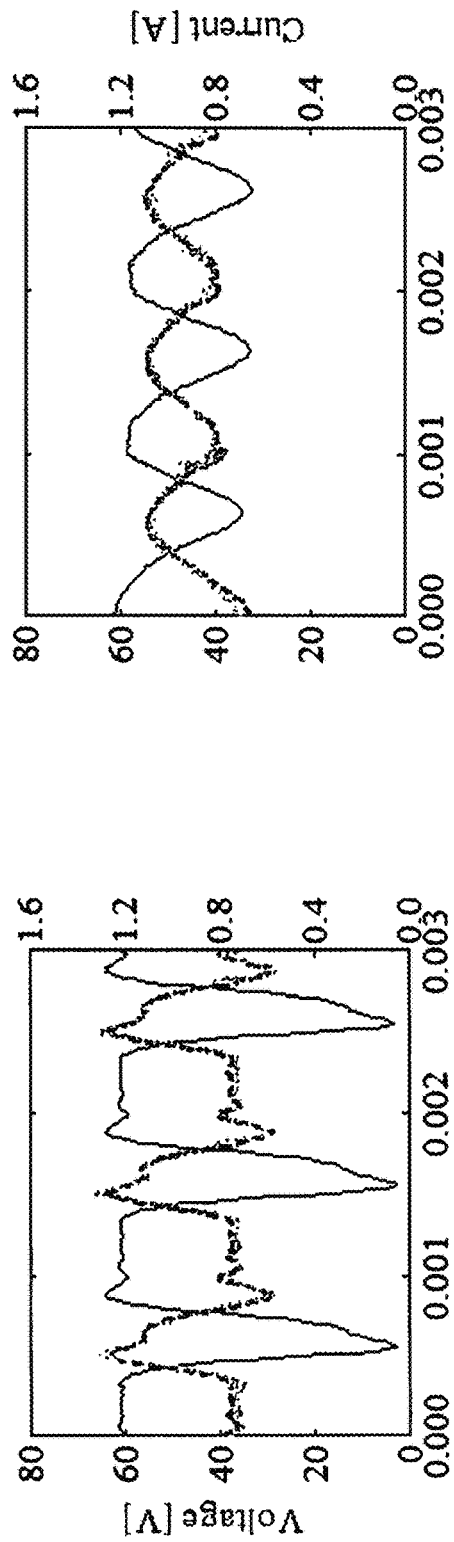
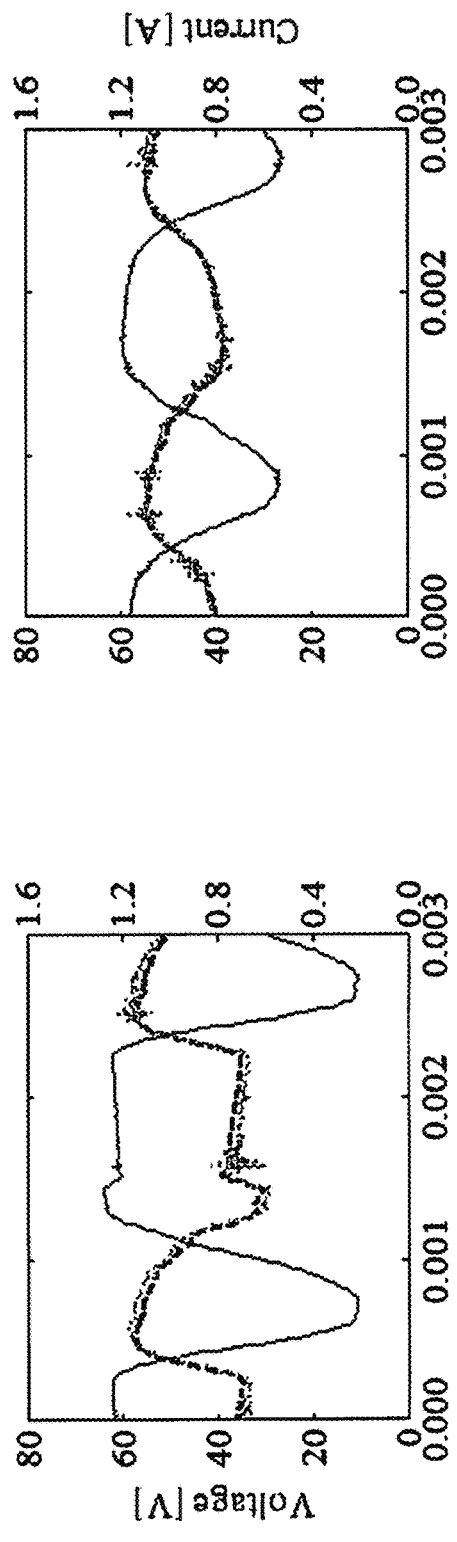
Figure 15A
Figure 15B
Figure 15C
Figure 15D

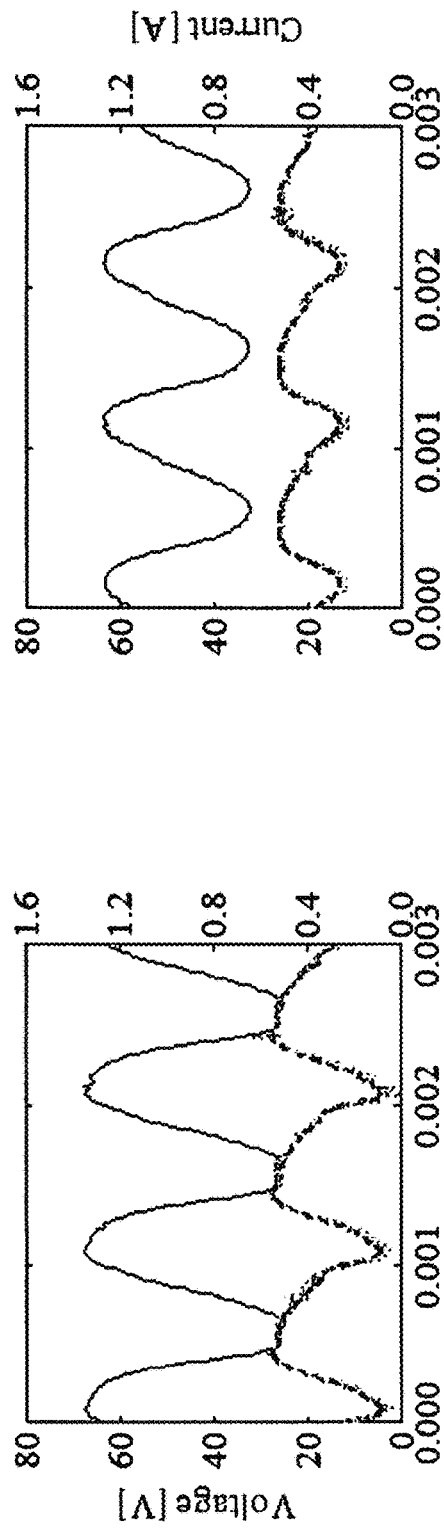
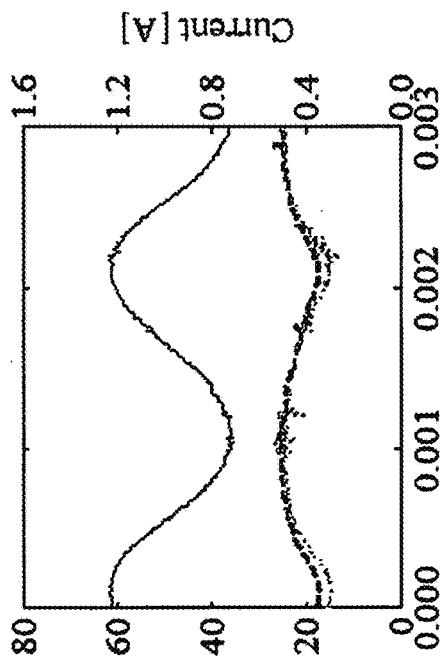
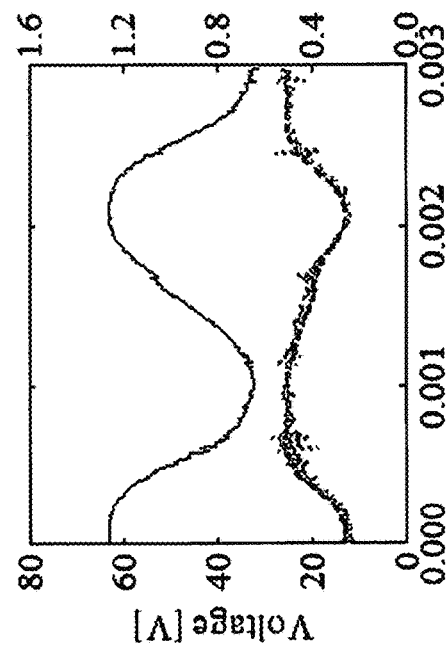
Figure 16A
Figure 16B
Figure 16C
Figure 16D

SYSTEM AND METHOD FOR DETERMINING A STATE OF A PHOTOVOLTAIC PANEL

TECHNICAL FIELD

The invention relates to a system and a method for determining a state of a photovoltaic (PV) panel. Particularly, although not exclusively, the invention relates to a system and a method for diagnosing health of a PV panel.

BACKGROUND

Solar power is one of the fastest growing clean energy sources. In a solar power plant, photovoltaic (PV) panels or solar cells are usually used for converting light energy into electrical energy.

The output of photovoltaic (PV) panels declines over time. And different panels decline at different rates. This phenomenon is also called "PV panel degradation", which is a complex nonlinear process. The degradation may be due to aging of components, utilization conditions, and environmental factors such as extreme weather conditions and physical damages or scratches. PV panel degradation has been found to be the one of the main causes of PV power generation failure.

There is a need to properly and timely determine the condition of PV panels in order to ensure proper, continuous, and effective power generation.

SUMMARY OF THE INVENTION

In accordance with a first aspect of the invention, there is provided a system for determining a state of a photovoltaic panel, comprising: a data acquisition device having: a circuit arranged to transmit excitation signals to a photovoltaic panel and detect response signals generated by the photovoltaic panel in response to the excitation signal, during normal operation of the photovoltaic panel, and a communication module arranged to communicate the detected response signals to a control device for analysis and determination of a state of the photovoltaic panel.

In one embodiment of the first aspect, the excitation signals include one or more voltage signals each having a respective non-zero perturbation frequency. Each excitation signal may have a duration in the order of milliseconds, e.g., several or several tens of milliseconds. Preferably, the response signals comprise a terminal voltage across the photovoltaic panel and an output current of the photovoltaic panel. The voltage signals are preferably arranged to drive a terminal voltage of the photovoltaic panel from minimum voltage level to maximum voltage level.

In one embodiment of the first aspect, the data acquisition device further includes a sampler for sampling the detected response signals, and the communication module is arranged to communicate the sampled detected response signals to the control device. The sampler may be implemented with a circuit, a controller, or the like.

In one embodiment of the first aspect, the data acquisition device includes a memory for storing the detected response signals. The memory may include one or more volatile memory unit, non-volatile unit, or any of their combinations.

In one embodiment of the first aspect, the circuit is arranged to be connected with two photovoltaic panels for transmitting respective excitation signals and for detecting respective response signals from the two photovoltaic panels.

In one embodiment of the first aspect, the circuit includes: a power converter with two switches; a driving circuit for providing gating signals to operate the two switches; a controller for controlling the driving circuit based on a difference between the detected response signal of one of the two photovoltaic panels and a reference signal; the driving circuit is arranged to operate the two switches complementarily; and the controller is arranged to control the driving circuit so as to control the detected response signal of the one of the two photovoltaic panels to follow the reference signal. The switches are preferably semiconductor switches. In one example, the reference signal comprises a reference voltage signal with a non-zero perturbation frequency, and the detected response signal of one of the two photovoltaic panels comprises a terminal voltage across the one of the two photovoltaic panels. Preferably, the power converter comprises a DC-DC converter such as a buck-boost converter arranged to operate in continuous conduction mode.

In one embodiment of the first aspect, the communication module comprises a wireless communication module. For example, the wireless communication module may include a ZigBee communication module.

In one embodiment of the first aspect, the system further includes the control device that includes a communication module for communicating with the data acquisition device. The communication module of the control device may comprise a wireless communication module complementary to the wireless communication module of the data acquisition device (i.e., uses same type of wireless transmission protocol). For example, the wireless communication module of the control device may include a ZigBee communication module. Preferably, the data acquisition device and the control device are both provided on-site, e.g., at the solar power plant.

In one embodiment of the first aspect, the control device further comprises a processing unit arranged to process the detected response signals to determine one or more intrinsic parameters indicative of the state of the photovoltaic panel.

In one embodiment of the first aspect, the processing unit is arranged to process the detected response signals by matching the detected response signals of the photovoltaic panel with a predetermined model for determining the one or more intrinsic parameters indicative of the state of the photovoltaic panel.

In one embodiment of the first aspect, the predetermined model comprises a dynamic single-diode model of a solar cell with: a current source providing a current based on incident light; a diode connected in parallel with the current source; a capacitor connected in parallel with the current source; a first resistor connected in parallel with the current source; and a second resistor connected in series with the first resistor.

In one embodiment of the first aspect, the processing unit includes: a current predictor for predicting a terminal current generated in the dynamic single-diode model based on the detected terminal voltage of the photovoltaic panel and a set of parameters in the dynamic single-diode model.

In one embodiment of the first aspect, the set of parameters in the dynamic single-diode model comprises one or more (and preferably all) of: a current $I_{ph}$ provide by the current source in the dynamic single-diode model; a reverse saturation current $I_o$ in the dynamic single-diode model; a thermal voltage $v_T$ in the dynamic single-diode model; a resistance $R_{sh}$ of the first resistor in the dynamic single-diode model, indicative of an intrinsic p-n junction resistance; a capacitance $C_{sh}$ of the capacitor in the dynamic single-diode model, indicative of an intrinsic p-n junction capacitance; and a resistance $R_s$ of the second resistor in the dynamic single-diode model.

In one embodiment of the first aspect, the processing unit further includes an optimization unit, operably connected with the current predictor, for determining one or more values of an objective function of the set of parameters in the dynamic single-diode model. Preferably, the one or more values of the objective function comprise the one or more intrinsic parameters indicative of the state of the photovoltaic panel.

In one embodiment of the first aspect, the optimization unit is arranged to determine one or more values of the objective function of the set of parameters by iteratively reducing a difference between the predicted terminal current generated in the dynamic single-diode model and the detected output current of the photovoltaic panel.

In one embodiment of the first aspect, the optimization unit is arranged to determine one or more values of the one or more intrinsic parameters indicative of the state of the photovoltaic panel using a real jumping gene genetic algorithm. In one example, the values of intrinsic parameters are generated using the real-jumping gene genetic algorithm. In one example, the value of objective function is determined by the current predictor, which establishes the optimality or correctness of the intrinsic parameters.

In one embodiment of the first aspect, the control device further comprises a further communication module for communicating the one or more determined intrinsic parameters to a storage that is preferably remote from the control device. The further communication module may comprise a wireless communication module. The further communication module may be a Wi-Fi communication module. Preferably, the communication protocol of the further communication module and the communication protocol of the communication module are different.

In one embodiment of the first aspect, the system also includes the remote storage arranged to store the intrinsic parameters determined by the control device. The remote storage may be a server, such as a cloud computing server, implemented with any number of information handling systems.

In accordance with a second aspect of the invention, there is provided a data acquisition device in the system of the first aspect.

In accordance with a third aspect of the invention, there is provided a control device in the system of the first aspect.

In accordance with a fourth aspect of the invention, there is provided a method for determining a state of a photovoltaic panel, comprising: transmitting excitation signals to a photovoltaic panel during normal operation of the photovoltaic panel; detecting response signals generated by the photovoltaic panel in response to the excitation signal; and communicating the detected response signals to a control device for analysis and determination of a state of the photovoltaic panel.

In one embodiment of the fourth aspect, the excitation signals comprise a plurality of voltage signals each having a respective non-zero perturbation frequency; and the response signals comprise a terminal voltage across the photovoltaic panel and an output current of the photovoltaic panel.

In one embodiment of the fourth aspect, the method further includes sampling the detected response signals, and the communicating step comprises communicating the sampled detected response signals to the control device.

In one embodiment of the fourth aspect, the method further includes storing the detected response signals.

In one embodiment of the fourth aspect, the method further includes processing the detected response signals to determine one or more intrinsic parameters indicative of the state of the photovoltaic panel.

In one embodiment of the fourth aspect, the step of processing comprises matching the detected response signals of the photovoltaic panel with a predetermined model for determining the one or more intrinsic parameters indicative of the state of the photovoltaic panel.

In one embodiment of the fourth aspect, the predetermined model comprises a dynamic single-diode model of a solar cell with: a current source providing a current based on incident light; a diode connected in parallel with the current source; a capacitor connected in parallel with the current source; a first resistor connected in parallel with the current source; and a second resistor connected in series with the first resistor.

In one embodiment of the fourth aspect, the step of matching comprises: predicting a terminal current generated in the dynamic single-diode model based on the detected terminal voltage of the photovoltaic panel and a set of parameters in the dynamic single-diode model.

In one embodiment of the fourth aspect, the set of parameters in the dynamic single-diode model comprises one or more of: a current $I_{ph}$ provide by the current source in the dynamic single-diode model; a reverse saturation current $I_o$ in the dynamic single-diode model; a thermal voltage $v_T$ in the dynamic single-diode model; a resistance $R_{sh}$ of the first resistor in the dynamic single-diode model, indicative of an intrinsic p-n junction resistance; a capacitance $C_{sh}$ of the capacitor in the dynamic single-diode model, indicative of an intrinsic p-n junction capacitance; and a resistance $R_s$ of the second resistor in the dynamic single-diode model.

In one embodiment of the fourth aspect, the step of matching further comprises determining one or more values of an objective function of the set of parameters in the dynamic single-diode model, the one or more values of the objective function comprises the one or more intrinsic parameters indicative of the state of the photovoltaic panel.

In one embodiment of the fourth aspect, the determination of the one or more values of the objective function of the set of parameters comprises iteratively reducing a difference between the predicted terminal current generated in the dynamic single-diode model and the detected output current of the photovoltaic panel.

In one embodiment of the fourth aspect, the determination of the one or more values of the one or more intrinsic parameters indicative of the state of the photovoltaic panel is performed using a real jumping gene genetic algorithm.

In one embodiment of the fourth aspect, the method further includes communicating the one or more intrinsic parameters indicative of the state of the photovoltaic panel to a remote storage.

In one embodiment of the fourth aspect, the method further includes analyzing a time series of the one or more intrinsic parameters to determine a predicted state of the photovoltaic panel.

In one embodiment of the fourth aspect, the method may be implemented partly or wholly using the system of the first aspect.

BRIEF DESCRIPTION OF THE DRAWINGS

Embodiments of the invention will now be described, by way of example, with reference to the accompanying drawings in which:

FIG. 15A is a graph showing measured voltage, measured current, and predicted current of the first PV panel in FIG. 13A under a first perturbation;

FIG. 15B is a graph showing measured voltage, measured current, and predicted current of the first PV panel in FIG. 13A under a second perturbation;

FIG. 15C is a graph showing measured voltage, measured current, and predicted current of the first PV panel in FIG. 13A under a third perturbation;

FIG. 15D is a graph showing measured voltage, measured current, and predicted current of the first PV panel in FIG. 13A under a fourth perturbation;

FIG. 16A is a graph showing measured voltage, measured current, and predicted current of the second PV panel in FIG. 13B under a first perturbation;

FIG. 16B is a graph showing measured voltage, measured current, and predicted current of the second PV panel in FIG. 13B under a second perturbation;

FIG. 16C is a graph showing measured voltage, measured current, and predicted current of the second PV panel in FIG. 13B under a third perturbation;

FIG. 16D is a graph showing measured voltage, measured current, and predicted current of the second PV panel in FIG. 13B under a fourth perturbation.

DETAILED DESCRIPTION OF THE PREFERRED EMBODIMENT

PV Panel Health Diagnostic System

Figure 1:
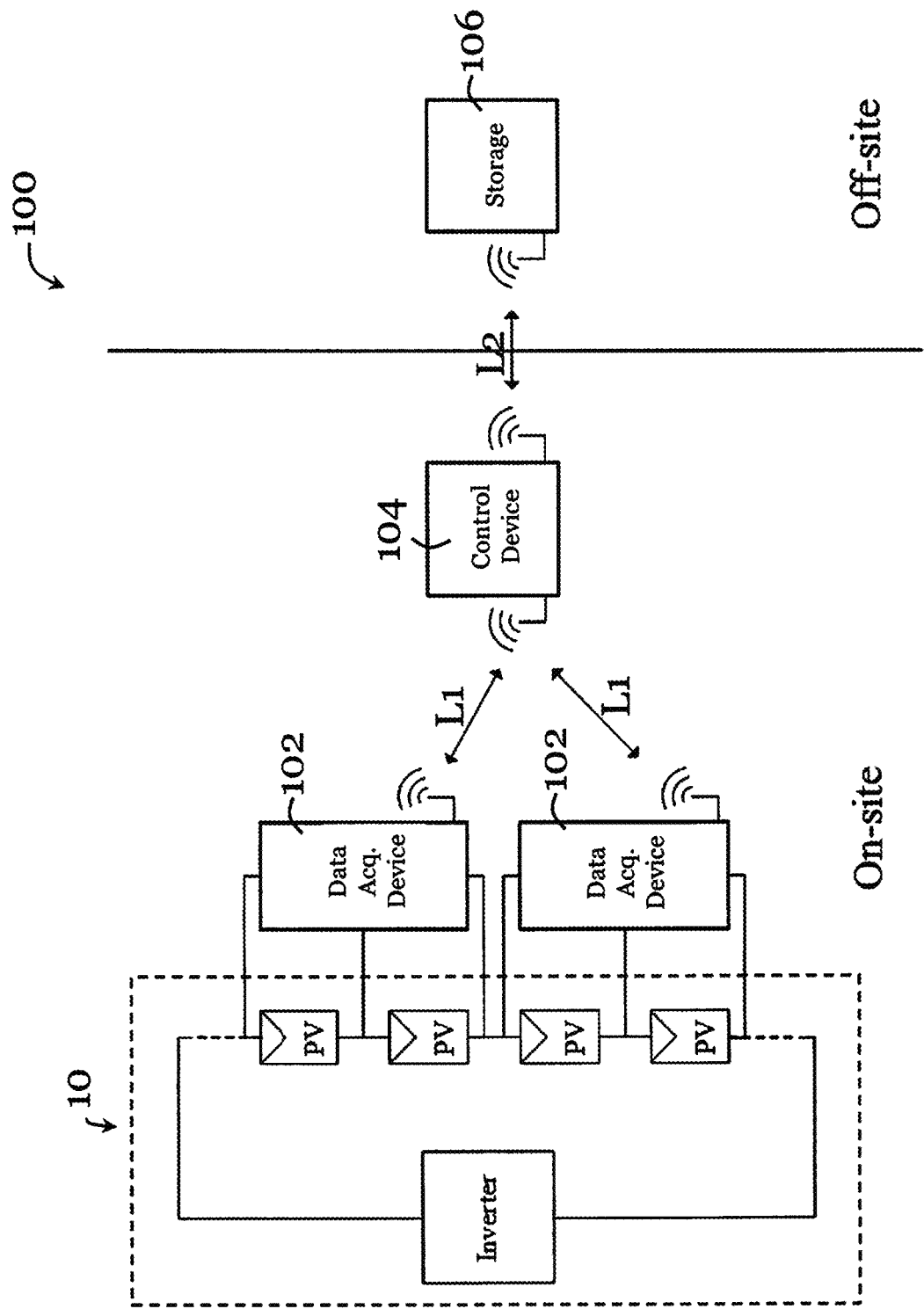
FIG. 1 is a schematic diagram illustrating a solar power plant connected with a system for determining a state of a PV panel in one embodiment of the invention.

Referring to FIG. 1, the PV solar power plant to includes four series-connected PV panels and a grid-tie inverter. A system too for determining the state of the PV panel is connected to the PV panels. In this embodiment, the system 100 includes two data acquisition devices 102, a control device 104 arranged to communicate data and information with the data acquisition devices 102, and a storage 106 arranged to communicate data and information with the control device 104. In this embodiment, the data acquisition devices 102 and the control device 104 are deployed on-site at the solar power plant 10, and the storage 106 is arranged off-site remote from the solar power plant 10. Each data acquisition device 102 is arranged to be connected with two PV panels, with connections across each PV panel. In this embodiment, the data acquisition device 102 communicates with the control device 104 through a wireless communication link L1. The control device 104 communicates with the storage 106 through a wireless communication link L2.

Figure 2:
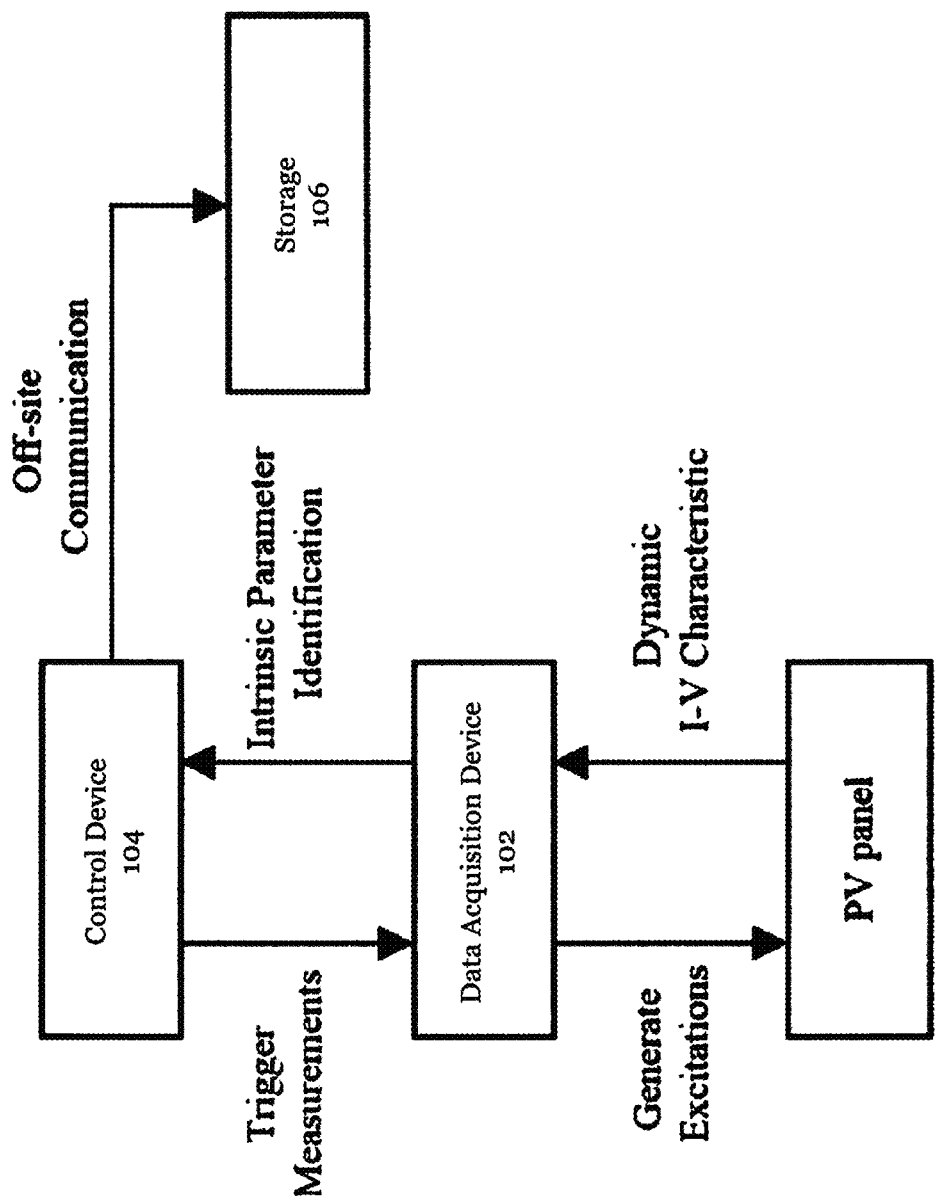
FIG. 2 is a block diagram showing a method for determining a state of a PV panel implemented using the system of FIG. 1 in one embodiment of the invention.

FIG. 2 shows the general operation flow in the system 100 of FIG. 1. In this embodiment, the control device 104 controls the schedule of performing diagnosis. The control device 104 sends triggering signals to the data acquisition devices 102 to trigger them to perform measurement. The data acquisition devices 102, upon receiving the triggering signals, generate excitations signals and provide the excitation signals to the respective PV panel, during normal operation of the PV panel. The data acquisition devices 102 then detect a response signals generated by the PV panels in response to the excitation signal. The response signals may include signals indicative of dynamic current-voltage characteristics of the PV panel. The data acquisition devices 102 transmit the received response signals to the control device 104, to perform analysis and identification of intrinsic parameters indicative of the state of the PV panel, using a real jumping gene genetic algorithm (RJGGA) based method, as further described below. The control device 104 transmits the data, for example the response signals or the analysis results, to the storage 106. The data in the control device 104 or the data in the storage 106 can be used for analysis and evaluation of the state of degradation of PV panels and for predicting the degradation of PV panels.

Figure 3:
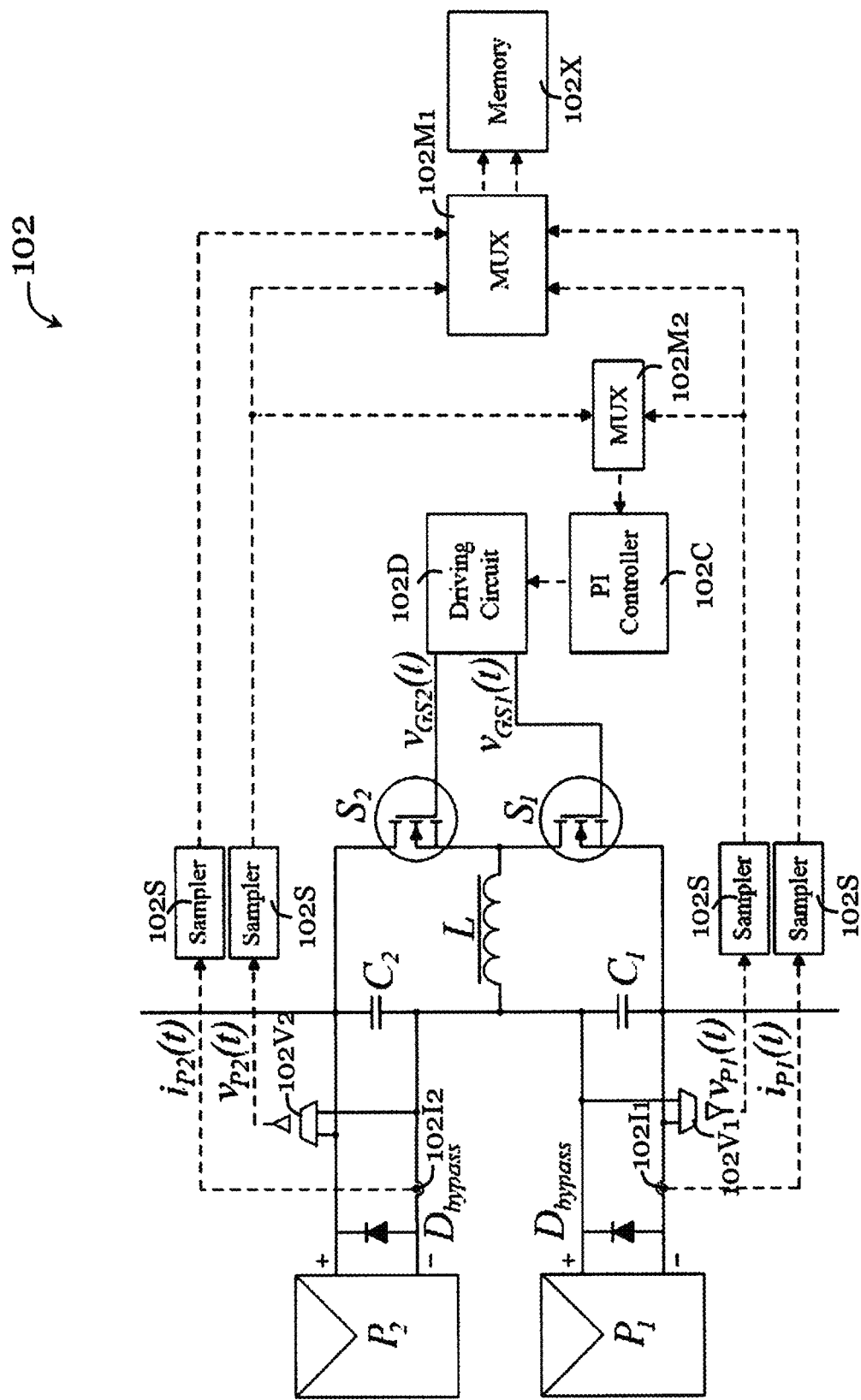
FIG. 3 is a simplified circuit diagram of the data acquisition device in the system of FIG. 1 in one embodiment of the invention.

The circuit topology of the data acquisition device 102 of FIG. 1 is illustrated in FIG. 3. As illustrated, the circuit topology is based on differential power processing architecture. This architecture facilitates integration of functionality of data acquisition devices into differential power processing devices, allowing the differential power processing devices to also conduct maximum power point tracking and diagnostics. As shown in FIG. 3, the data acquisition device 102 is connected to two PV panels and it serves two main functions. First, it injects large-signal perturbations into the connected PV panels. Second, it samples and records the terminal voltage and current, and then wirelessly transfers them to control device 104.

The data acquisition device 102 includes power converter, in the form of a DC-DC converter with a buck-boost-derived structure controlled to operate in continuous conduction mode. The converter includes two switches $S_1$ and $S_2$ controlled by a driving circuit. The converter also includes two capacitors $C_1$ and $C_2$ each connected across a respective PV panel and an inductor L connected with the junction of the two switches $S_1$ and $S_2$ and the junction of the two capacitors $C_1$ and $C_2$. The data acquisition device 102 also includes a current detector 102I1 arranged to detect an output current of the PV panel $P_1$, a voltage detector 102V1 arranged to detect a terminal voltage across the PV panel $P_1$, an output current 102I2 of the PV panel $P_2$, and a voltage detector 102V2 arranged to detect a terminal voltage across the PV panel $P_2$. Each voltage detector 102V1, 102V2 and current detector 102I1, 102I2 is connected with a respective sampler 102S for sampling the detected signals. The samplers 102S are connected to a multiplexer 102M1 and a memory 102X for storing the detected and sampled measurements. The sampled voltage signals are fed back into the power converter through a multiplexer 102M2 and a PI controller 102C for controlling the driving circuit 102D of the switches $S_1$ and $S_2$ in the power converter. In operation, the switches $S_1$ and $S_2$ are controlled to operate complementarily.

Figure 4:
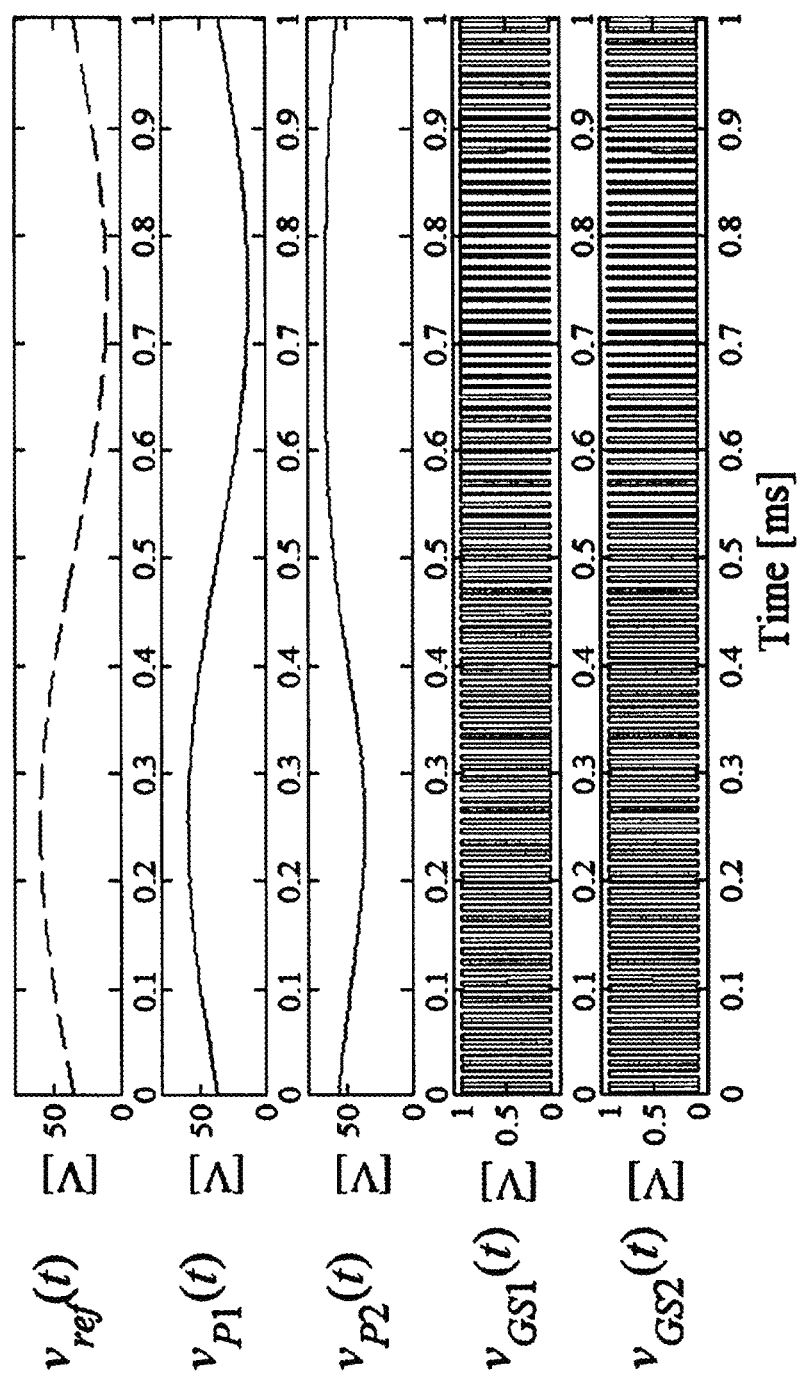
FIG. 4 is a graph showing key waveforms in the circuit of FIG. 3 during a period of perturbation.

FIG. 4 shows the key waveforms in the circuit of FIG. 3, including the gate signals $v_{GS1}(t)$ and $v_{GS2}(t)$, and the respective terminal voltages of the panels $v_{P1}(t)$ for $P_1$ and $v_{P2}(t)$ for $P_2$. Since the power converter is controlled to operate in continuous conduction mode, it can be shown that $v_{P1}(t)$ and $v_{P2}(t)$ can be related by $$\frac{v_{P1}(t)}{v_{P2}(t)} = \frac{1-d(t)}{d(t)} \quad (1)$$

where $d(t)$ is duty ratio of $S_1$.

As shown in FIG. 4, v at) is controlled to follow the waveform of a sinusoidal reference $v_{ref}(t)$ with the perturbation frequency f. In particular, the sampled $v_{P1}(t)$ is firstly compared with $v_{ref}(t)$ and their difference is then processed by a proportional-plus-integral (PI) controller to control the switching states of the two switches $S_1$ and $S_2$.

Figure 5:
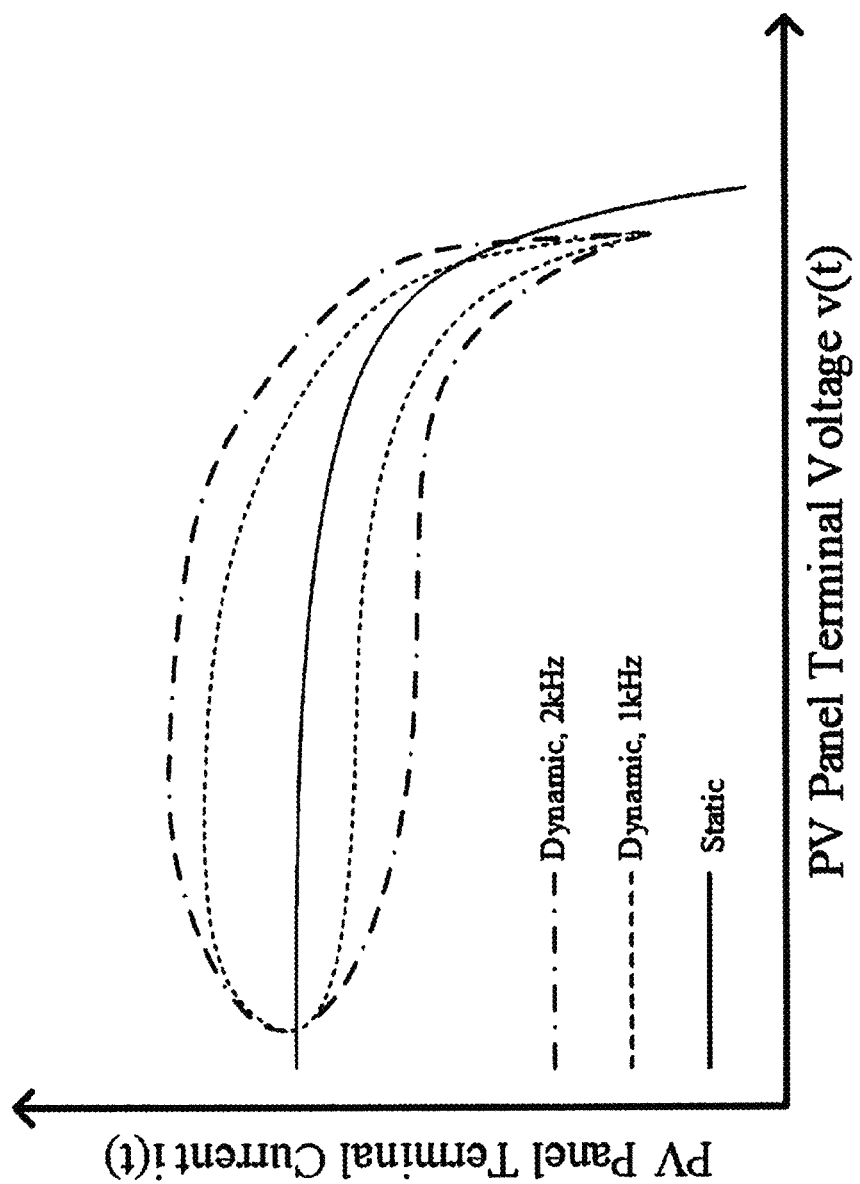
FIG. 5 is a graph showing current-voltage (I-V) response of a PV panel in FIG. 1 under different perturbation frequencies.

FIG. 5 shows the trajectories of the response signals, i.e., the terminal voltage and output current, under different perturbation frequencies f. When f=0, the trajectory is a static current-voltage characteristic. As f increases, a hysteresis loop appears due to the equivalent shunt capacitance in the PV panels. The hysteresis loop becomes more significant when the perturbation frequency or shunt capacitance increases.

During excitation and detection operation, the data acquisition devices sample the terminal voltage and current of the PV panel throughout the perturbation period. Generally, each perturbation last several or several tens of milliseconds. In one embodiment a total of four perturbation cycles are conducted. The perturbation process enforces the required voltage ratio between the two connected PV panels to drive the terminal voltage of the tested panel from minimum to maximum voltage level. The minimum and maximum voltages are between the nominal value of short circuit and open circuit voltage, as bounded by the current level of degradation and irradiation, or by the operation point of the grid-tie inverter, or even by both.

Having obtained the detected and sampled signals, it is necessary to process them to determine the state of the PV panels. Essentially, this diagnostic process can be translated into an optimization task. The objective of the optimization task is to match the measured I-V characteristic to the mathematical model prediction. Matching the model and measurements reveals intrinsic parameters governing the behavior of the PV panel. The model is based on the dynamic single-diode model of a solar cell shown in FIG. 6.

Figure 6:
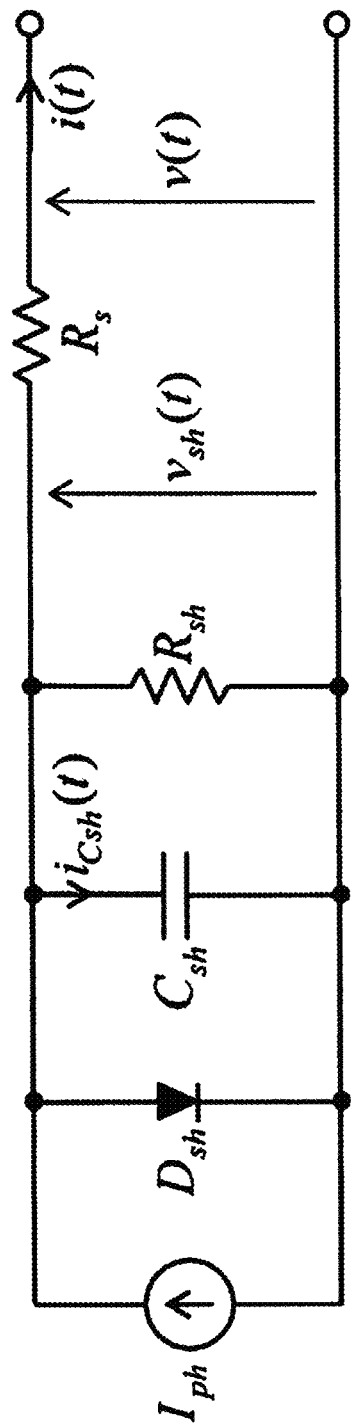
FIG. 6 is a circuit diagram illustrating a dynamic model of a solar cell for modeling the PV panel in the system of FIG. 1 in one embodiment of the invention.

Referring to FIG. 6, the model includes a current source $I_{ph}$ providing a current based on incident light, a diode $D_{sh}$ connected in parallel with the current source, a capacitor $C_{sh}$ connected in parallel with the current source, a first resistor $R_{sh}$ connected in parallel with the current source, and a second resistor $R_s$ connected in series with the first resistor $R_{sh}$. The voltage across the first resistor $R_{sh}$ is denoted as $v_{sh}(t)$. The terminal output voltage and output current are denoted as v(t) and i(t) respectively.

Figure 7:
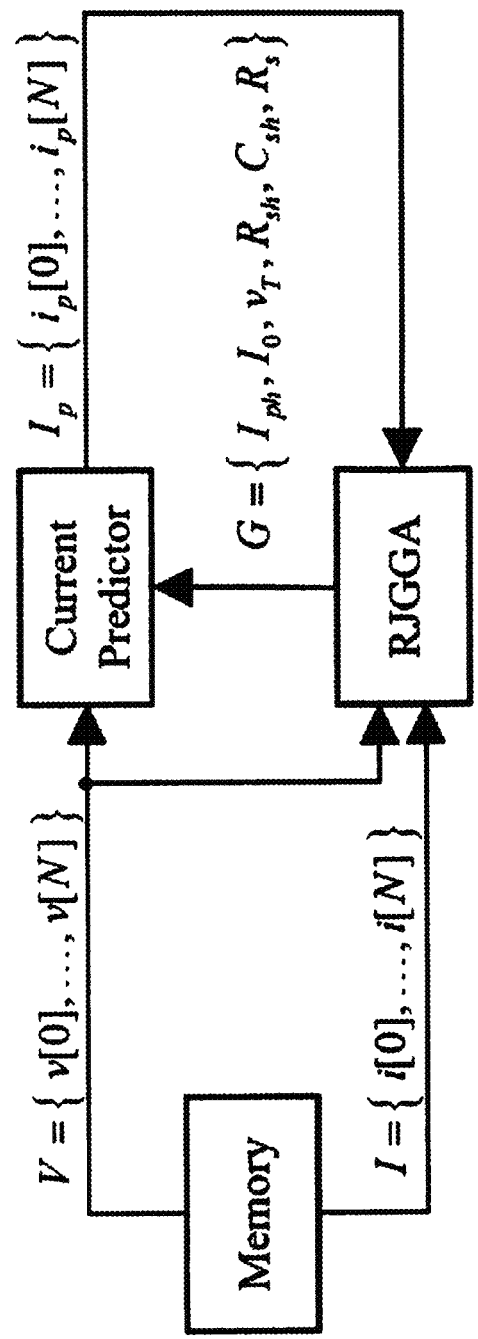
FIG. 7 is a functional block diagram illustrating interaction of current predictor and RJGGA-based optimization unit of the control device of FIG. 1 in one embodiment of the invention.

The general mechanism for determining the intrinsic parameters of PV panels is shown in FIG. 7. The mechanism includes two main components, a current predictor and an optimization unit arranged to implement a RJGGA-based optimization method. As shown in FIG. 7, the interface between the current predictor and the optimization unit is provided through parameters of the solar cell model in FIG. 6, described by a vector G:

$$G=\{I_{ph},I_o,v_T,R_{sh},C_{sh},R_s\} \quad (2)$$

where $I_{ph}$ is the current determined by the incident light, $I_o$ is the reverse saturation current, $v_T$ is the thermal voltage, and $C_{sh}$ and resistor $R_{sh}$ are used to model the p-n junction, respectively, and $R_s$ is the series resistance of the circuit model for describing the electrical characteristics of solar cell.

The current predictor is used for predicting the generated terminal current by the solar cell model, given the terminal voltage v(t) and set of solar cell parameters G. The predicted current $i_p(t)$ is the basis for fitness evaluation necessary for RJGGA optimization. The time series of the panel voltage v(t) and panel current i(t) contains samples. Let V and I be the two time series:

$$V=\{v[0],v[1],\ldots v[k],\ldots v[N]\} \quad (3)$$

$$I=\{i[0],i[1],\ldots i[k],\ldots i[N]\} \quad (4)$$

The current predictor calculates voltage across $C_{sh}$ as a time-series $V_{sh}$, defined as $$V_{sh}=\{v_{sh}[0],v_{sh}[1],\ldots v_{sh}[k],\ldots v_{sh}[N]\} \quad (5)$$

The current predicted by the solar cell model is defined as $$I_P=\{i_p[0],i_p[1],\ldots i_p[k],\ldots i_p[N]\} \quad (6)$$

The current predictor iterates through the measured voltage v[k], calculating $v_{sh}[k]$ and predicted current $i_p[k]$ in the following steps.

Step (1): The initial condition assumes zero current passing through $C_{sh}$, $$C_{sh}\frac{dv_{sh}}{dt}(v_{sh},v)=0 \quad (7)$$

therefore $v_{sh}[0]$ can be determined from $$I_{ph} = I_G \left( e^{\frac{v_{sh}[k]}{vT}} - 1 \right) + \frac{v_{sh}[0]}{R_{sh}} + \frac{v_{sh}[0] - v[0]}{R_s} \quad (8)$$

Step (2): Calculate predicted current at time step k $$i_p[k] = \frac{v_{sh}[k] - v[k]}{R_s} \quad (9)$$

Step (3): Calculate the value of $v_{sh}[k+1]$ $$v_{sh}[k+1] - v_{sh}[k] = \frac{h}{2}\frac{dv_{sh}}{dt}(v_{sh}[k], v[k]) + \frac{h}{2}\frac{dv_{sh}}{dt}(v_{sh}[k+1], v[k+1]) \quad (10)$$

where $$\frac{dv_{sh}}{dt}(v_{sh}, v)$$

is defined by $$\frac{dv_{sh}}{dt}(v_{sh}, v) = \frac{1}{C_{sh}}\left[I_{ph} - I_0\left(e^{\frac{v_{sh}[k]}{vT}} - 1\right) - \frac{v_{sh}}{R_{sh}} - \frac{v_{sh} - v}{R_s}\right] \quad (11)$$

Step (4): k is increased by 1.
Step (5): Steps (2) to (4) are repeated until k=N
In the above, equations (10) and (11) are solved by the trapezoidal rule.

In this embodiment, RJGGA is used to solve the optimization task by operating over a pool of individuals. In RJGGA, Every individual G is represented by a set of chromosomes, such that the chromosomes match one set of solar cell model parameters outlined in Equation (2).

The pool of individuals evolves iteratively in generations, with every generation striving to minimize the discrepancy between the predicted current in Equation (6) and the measured current in Equation (4). Identification of individuals with favorable chromosomes is based on $$f_{obj}(G) = \frac{1}{N_2 - N_1 + 1}\sum_{k=N_1}^{N_2}(i_p[k] - i[k])^2 \quad (12)$$

where $N_1$ and $N_2$ are the first and the last sample of $i_p[k]$ and $i[k]$ respectively, used for evaluation. For the samples $k<N_1$ of $i_p[k]$, the current predictor is in a transitional state, due to the assumption about the initial current through $C_{sh}$ according to Equation (7).

The fitness of individual is indirectly proportionate to its value of Equation (12). Therefore, the lower the value, the more fit solution the individual represents. The goal of the optimization task is then represented by the following $$G_0 = \underset{G}{\operatorname{argmin}}(f_{obj}(G)) \quad (13)$$

The individuals evolve within a bounded space with upper and lower boundaries, $G^{MAX}$ and $G^{MIN}$ respectively $$G^{MAX} = \{I_{ph}^{MAX}, I_0^{MAX}, v_T^{MAX}, R_{sh}^{MAX}, C_{sh}^{MAX}, R_s^{MAX}\} \quad (14)$$

$$G^{MIN} = \{I_{ph}^{MIN}, I_0^{MIN}, v_T^{MIN}, R_{sh}^{MIN}, C_{sh}^{MIN}, R_s^{MIN}\} \quad (15)$$

Figure 8:
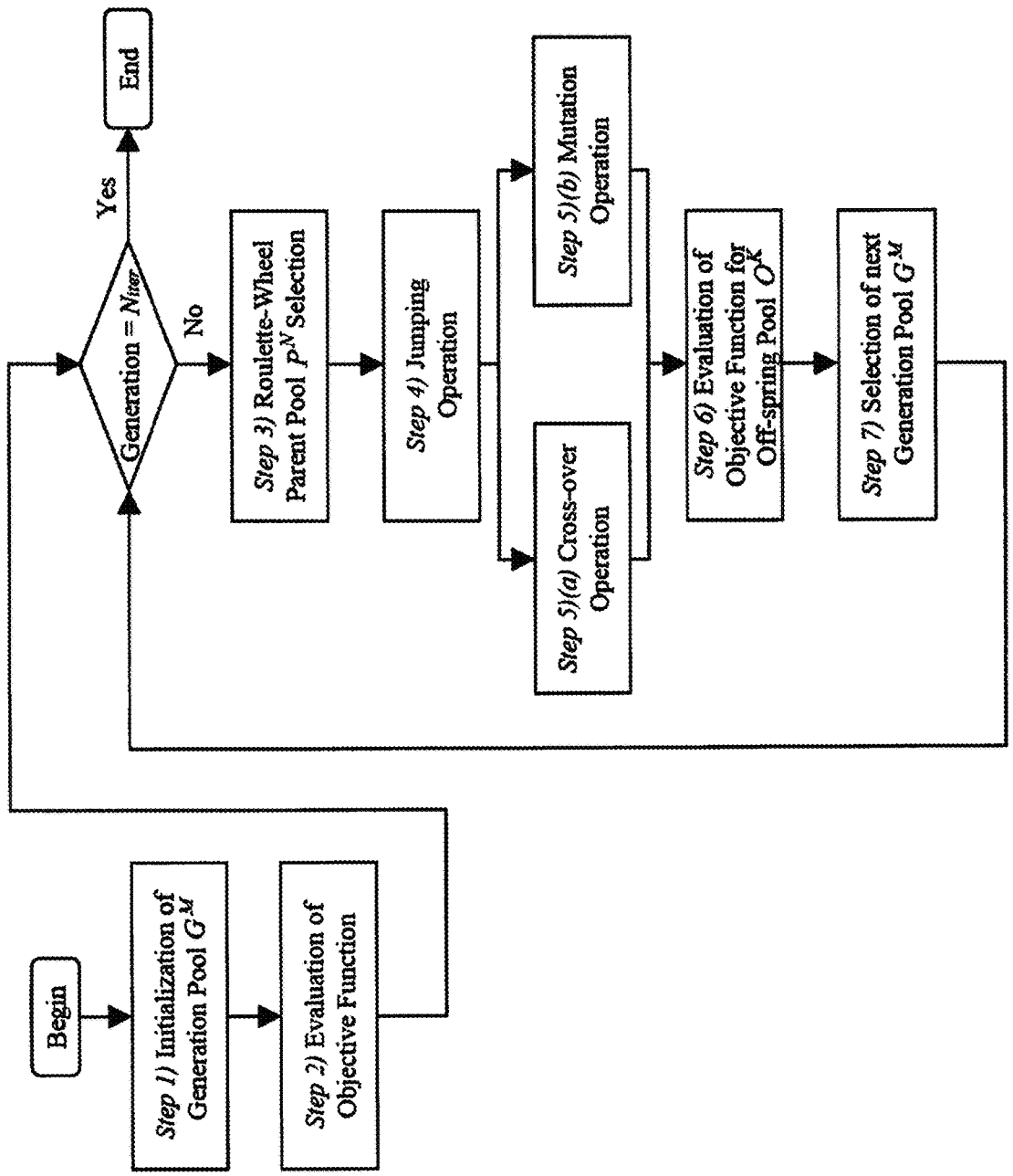
FIG. 8 is a flow chart illustrating a RJGGA-based optimization method implemented by the optimization unit of FIG. 7 in one embodiment of the invention.

The evolution process in the RJGGA-based method in the present embodiment is illustrated in FIG. 8 and is executed according to the following steps.

Step (1): Initialization of pool $G^M$ with M individuals with random values of chromosomes.

Step (2): Fitness evaluation of individuals in $G^M$

Step (3): Selection of parent pool $P^N$, as n individuals from $G^M$, according to probability $p_w$, using Roulette wheel selection disclosed in G. Jones, "*Genetic and Evolutionary Algorithms,*" *Encyclopedia of Computational Chemistry.* John Wiley & Sons, Ltd, 15 Apr. 2002.

Step (4): For every $P'' \in P^N$ and for every chromosome $p_i^N \in P''$, perform jumping operation according to probability $p_j$ on currently iterated parent $P^1 \in P^N$, and randomly selected parent $P^2 \in P^N$. A copy of $P^1$ is generated except the chromosome $P_1''$ resulting in offspring individual $O \in O^K$, with modified $P_i''$ according to:

If $P^1 \neq P^2$, cross-over operation is applied to $P_1''$ according to Equation (16).
If $P^1 = P^2$ mutation operation is applied to according to Equation (19).

Step (5a): Perform cross-over operation according to probability $p_c$, on arbitrarily coupled individuals $P^1 = \{p_1^1, \ldots, p_1^6\}$, $P^2 = \{p_2^1, \ldots, p_2^6\} \in P^N$. Two off-spring individuals and are generated based on $$o_i^1 = \frac{1}{2}[(1 - \beta_k)p_i^1 + (1 + \beta_k)p_i^2] \quad (16)$$

$$o_i^2 = \frac{1}{2}[(1 + \beta_k)p_i^1 + (1 - \beta_k)p_i^2] \quad (17)$$

where $\beta_k$ is a sample from distribution prescribed by $$\beta(u) = \begin{cases} (2u)^{1/\eta_c + 1} & \text{if } u \leq 0.5 \\ [2(1-u)]^{-1/\eta_c + 1} & \text{otherwise} \end{cases} \quad (18)$$

$\eta_c$ is a parameter. The higher the value of $\eta_c$ the higher the probability for the off-spring to resemble parents. The u is random number from interval [0,1].

Step (5b): Perform jumping operation according to the probability $p_m$, for every $P'' \in P^N$ and for its every chromosome $P_i'' \in P''$, to generate one off-spring individual $O \in O^k$ as copy of $P''$, with $p_1^N$ exchanged for $y_i$, defined by $$y_i = \begin{cases} p_i^n + (G_i^{MAX} - p_i^n) & \text{if } \delta \geq 0 \\ p_i^n + (p_i^n - G_i^{MIN}) & \text{otherwise} \end{cases} \quad (19)$$

where $\delta$ is a sample from distribution prescribed by $$\delta(u) = \begin{cases} (2u)^{1/\eta_m + 1} - 1 & \text{if } u \leq 0.5 \\ 1 - [2(1-u)]^{-1/\eta_m + 1} & \text{otherwise} \end{cases} \quad (20)$$

$\eta_m$ is a parameter and u is a random number from interval [0,1].

Step (6): Fitness evaluation of $O^K$, where $O^K$ is a pool of offspring individuals generated in Step 4) and 5).

Step (7): $G^M$ is re-established by selecting the fittest M individuals from $P^N$ and $O^K$, other individuals are discarded.

Step (8): Repeat the Steps (3) to (7) until the generation count reaches the predefined number of generations $N_{iter}$.

If any off-spring individual, after cross-over operation, has chromosome outside of the search space limit $G^{MIN}$ or $G^{MAX}$, the chromosome is randomly generated within the limits.

One of the major bottleneck of the optimization process is the evaluation of Equations (9) to (11). In this embodiment, the RJGGA optimization unit can be split into hardware part using FPGA, and software part on ARM processor. Such implementation benefits from parallel acceleration by multiple parallel Solvers deployed in FPGA and ease of software programming.

Figure 9:
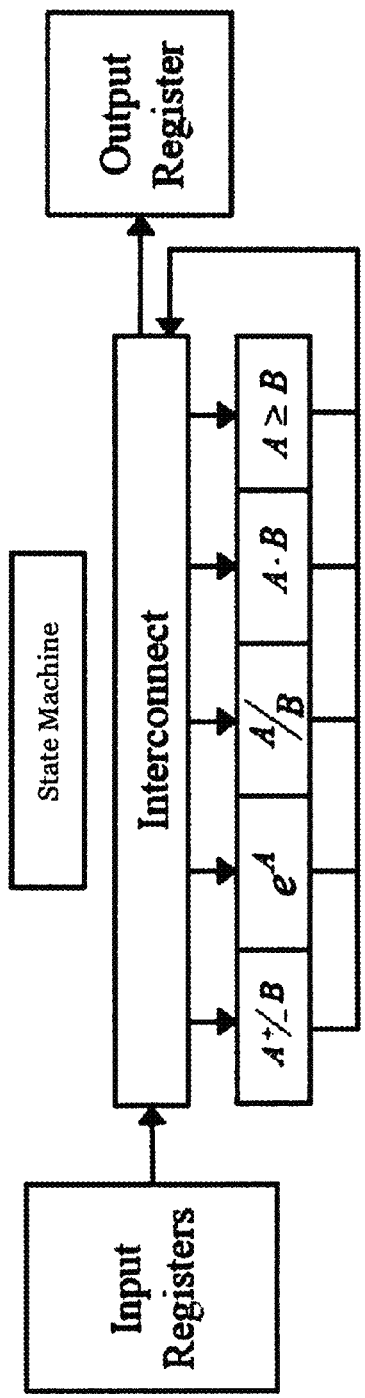
FIG. 9 is a schematic diagram of a solver in an FPGA unit of the control device of FIG. 1 in one embodiment of the invention.
Figure 10:
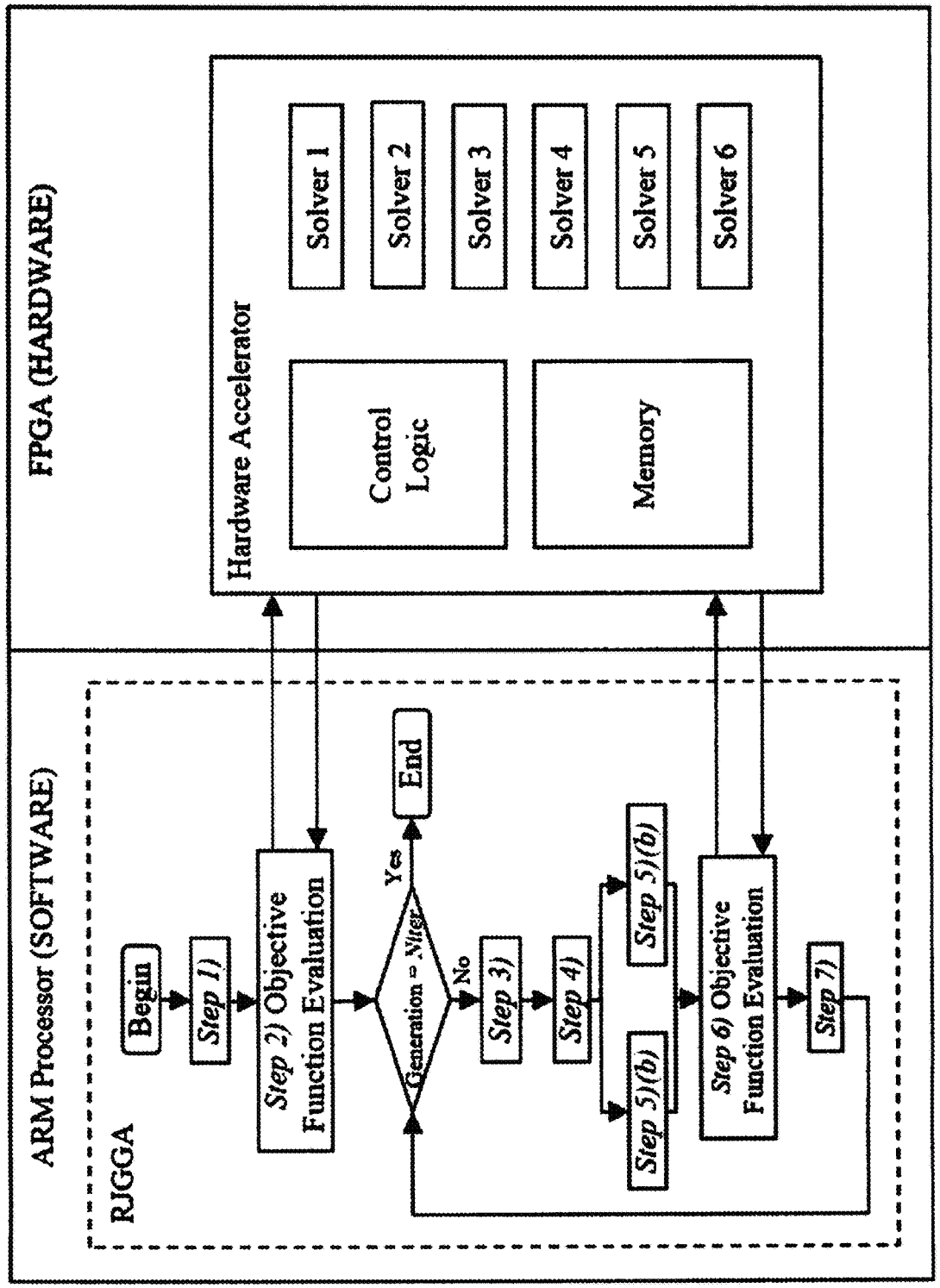
FIG. 10 is a functional block diagram illustrating an ARM processor and a FPGA unit of the control device of FIG. 1 in one embodiment of the invention.

FIG. 9 illustrates the internal structure of one Solver. The Solver includes input registers, output registers, and an interconnect connected between the input and output registers for controlling data flow. Various arithmetic modules are connected with the interconnect. The Solver is arranged to break down the equations into single mathematical operations. The Solver also has a state machine for controlling the timing and data flow through the interconnect. The Interconnect re-routes the connections among the input and output registers and the floating-point operation cores.

Figure m illustrates the integration of Solvers into RJGGA optimization. As the group of Solvers share the same memory and are controlled by the same Control Logic, the implementation can be referred to as Hardware Accelerator.

The RJGGA interacts with the Hardware Accelerator through individuals G as previously described and illustrated in FIG. 7. Besides the individuals, the input to the Hardware Accelerator is the time series in Equations (3) and (4). The output is the value of the objective function in Equation (12) for evaluated individuals.

Experimental Results

Figure 11:
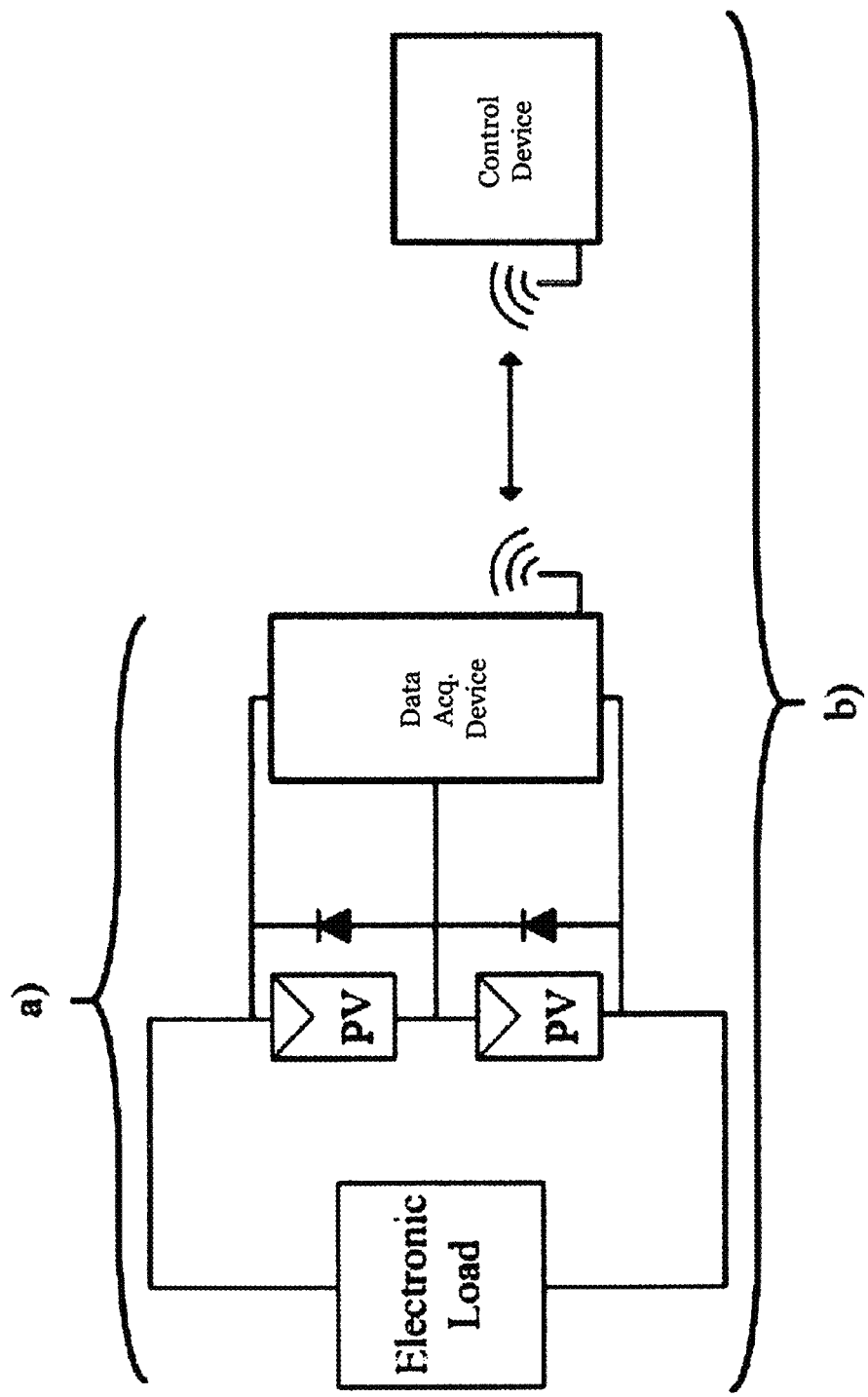
FIG. 11 is a schematic diagram showing a test setup for simulation (a) and experiment (b) for verifying the performance of the system of FIG. 1 and the method of FIG. 2.

The use of RJGGA-based method for solar cell model identification in the above embodiment is tested on data generated by PSIM model, following the configuration topology outlined in FIG. 11, part (a). The two solar cell models connected to the data acquisition devices are simulated with values listed in Table I.

TABLE I

Solar Cell Model Parameters

| Parameter | Value |
|---|---|
| $I_{ph}$ (A) | 1 |
| $I_o$ (A) | $1 \times 10^{-7}$ |
| $v_T$ (V) | 5 |
| $R_{sh}$ ($\Omega$) | 1000 |
| $C_{sh}$ (F) | $1 \times 10^{-6}$ |
| $R_s$ ($\Omega$) | 1 |

The data acquisition devices' DC-DC converter is simulated using values $C_1=C_2=1$ µF and L=150 µH. The reference signal for data acquisition devices excitation process is set at 1 kHz sine wave with peak-to-peak value of 75 V and positive bias 42.5V, that is from 5V to 80V. The electronic load is represented by a constant resistance, as the perturbations are performed at speed, where grid-tie inverter is seen as a static load.

To prove the identification capabilities of the RJGGA-base method in the above embodiment, the search space limits are set to cover a large variety of PV panels. The limits of the RJGGA search space are listed in Table II. Table III states the parameters of both RJGGA and Current Predictor.

TABLE II

RJGGA Search Space Limits

| Parameter | $G^{MIN}$ | $G^{MAX}$ |
|---|---|---|
| $I_{ph}$ (A) | 0.1 | 6.0 |
| $I_o$ (A) | 0 | $1 \times 10^{-3}$ |
| $v_T$ (V) | 3 | 100 |
| $R_{sh}$ ($\Omega$) | 100 | 10000 |
| $C_{sh}$ (F) | $1 \times 10^{-7}$ | $1 \times 10^{-5}$ |
| $R_s$ ($\Omega$) | 0.1 | 10.0 |

TABLE III

RJGGA and Current Predictor Parameters

| Parameter | Value |
|---|---|
| M | 100 |
| n | 50 |
| $p_j$ | 0.05 |
| $p_s$ | 0.8 |
| $p_m$ | 0.2 |
| $\eta_c$ | 0 |
| $\eta_w$ | 4 |
| $N_{iter}$ | 4000 |
| trapezoidal rule error | $1 \times 10^{-5}$ |
| trapezoidal rule iterations | 50 |
| $N_1$ | 100 |
| $N_2$ | 300 |

The diagnostic process is performed 100 times on a single set of terminal voltage and current time series generated by the PSIM simulation. The value of objective function for the best individual within every generation is recorded and plotted in FIG. 12. Table IV lists the mean value µ and standard deviation σ of six solar cell parameters obtained as the result of RJGGA optimization. The value $f_{obj}$ is included, for which the standard deviation σ shows the consistency of RJGGA optimization.

TABLE IV

Solar Cell Model Identification by RJGGA

| Parameter | µ | σ |
|---|---|---|
| $I_{ph}$(A) | 0.99 | $7.63 \times 10^{-6}$ |
| $I_o$(A) | $8.51 \times 10^{-6}$ | $1.08 \times 10^{-8}$ |
| $v_T$(V) | 4.93 | $5.34 \times 10^{-4}$ |
| $R_{sh}$($\Omega$) | 983.10 | 0.36 |
| $C_{sh}$(F) | $9.99 \times 10^{-7}$ | $9.36 \times 10^{-12}$ |
| $R_s$($\Omega$) | 1.12 | $6.34 \times 10^{-5}$ |
| $f_{obj}$ (—) | $7.78 \times 10^{-6}$ | $2.01 \times 10^{-10}$ |

Figure 12:
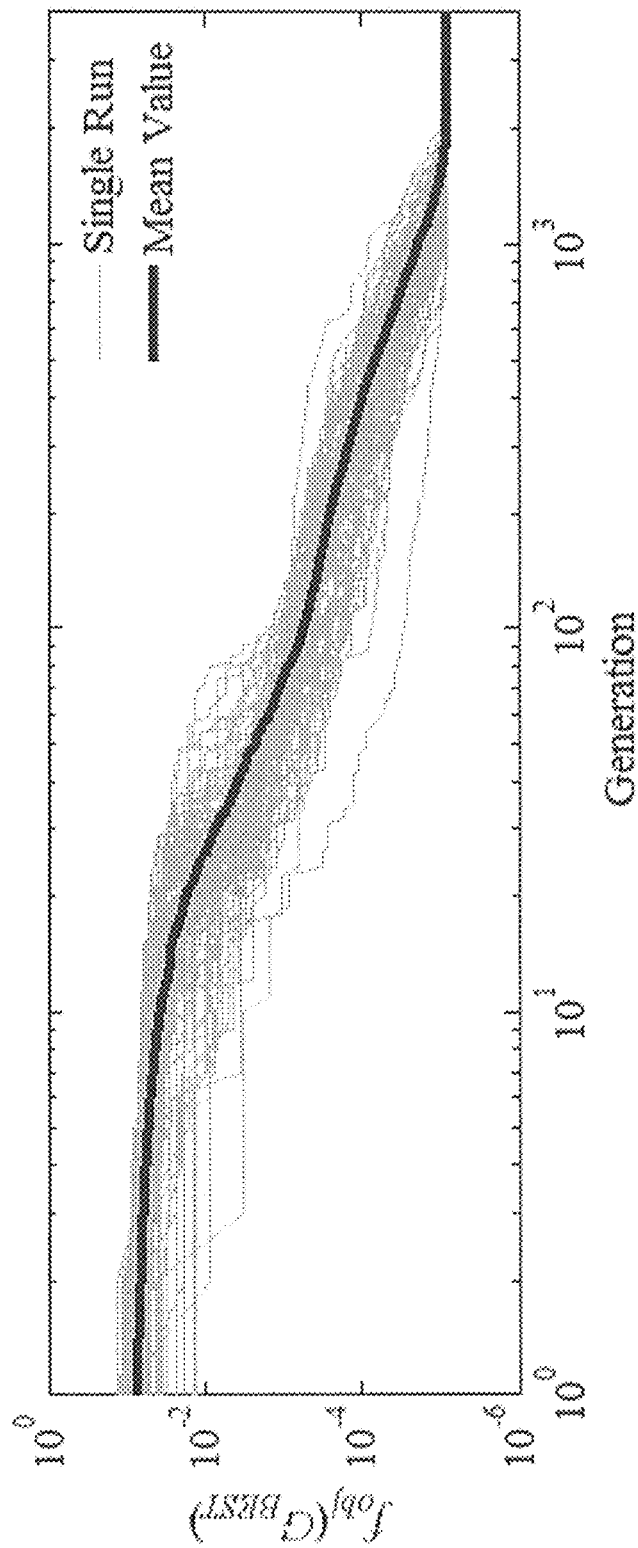
FIG. 12 is a graph showing test results of a change in the value of the objective function during optimization.

The convergence trend in FIG. 12 shows steady performance with the RJGGA as all 100 performed runs attain final value of objective function below $10^{-5}$. The RJGGA outperforms MPSO algorithm by steadily achieving one order of magnitude lower value of objective function in spite of the wider search space limits.

In A. Sangwongwanich, Y. Yang, D. Sera and F. Blaabjerg, "*Lifetime Evaluation of Grid-Connected PV Inverters Considering Panel Degradation Rates and Installation Sites,*" IEEE Trans. on Power Electronics, vol. 33, no. 2, pp. 1225-1236, February 2018., researchers examine environmental effects on PV panel degradation over 20 years of active duty. The power generation capabilities between the new and 20 years old PV panels differ up to 20%. The intrinsic parameters reflect the change in power generation output as the identification process is based on matching terminal voltage and current.

Since the degradation process occurs over the years, for practical purposes the tests are realized on a set of PV panels with different levels of power generation, as opposed to the collection of data from a single panel over years.

Two prototypes are developed for experimental verification of the above embodiment. The lists of components used in data acquisition devices and control device are given in Table V and Table VI respectively.

Figures 13A, 13B, 13C, 13D:
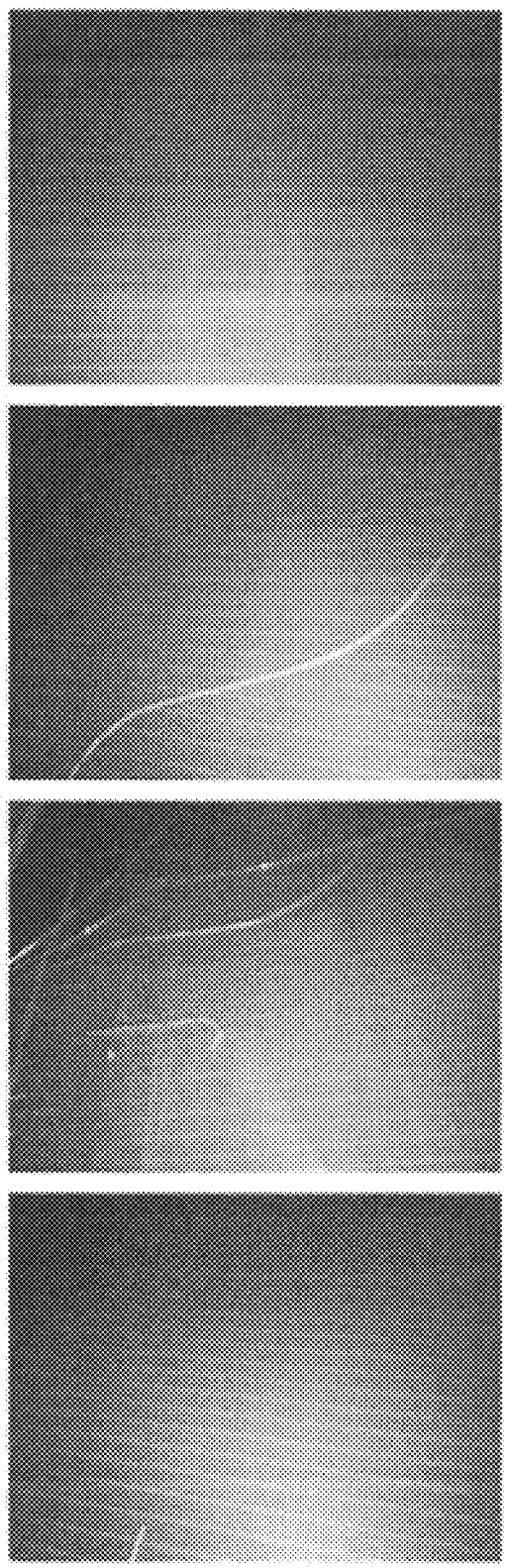
FIG. 13A is a picture showing a first PV panel used in the experiment for verifying the performance of the method in FIG. 2.
FIG. 13B is a picture showing a second PV panel used in the experiment for verifying the performance of the method in FIG. 2.
FIG. 13C is a picture showing a third PV panel used in the experiment for verifying the performance of the method in FIG. 2.
FIG. 13D is a picture showing a fourth PV panel used in the experiment for verifying the performance of the method in FIG. 2.

The configuration of the experimental setup is shown in FIG. 11, part (b). The tests are conducted with four different PV panels, $P_1$, $P_2$, $P_3$ and $P_4$ as shown in FIG. 13. The PV panels are divided into two groups according to their power generation output. The PV panels $P_2$ and $P_3$ exhibit relatively lower power output compared to $P_1$ and $P_4$, due to physical damage. The grid-tie inverter is represented by an electronic load. The list of devices used in experiments is shown in Table VII.

TABLE VII

List of Devices used in Experimental Verification

| Device | Manufacturer | Model no. | Specification |
|---|---|---|---|
| Solar Panel | Sungen | SG-NH80-GG | 80 W, a-Si |
| Light | Philips | QVF137 | 1 kW |
| Elec. Load | HP | HP6050A/60503B | 250 V, 10 A |

Figure 14B:
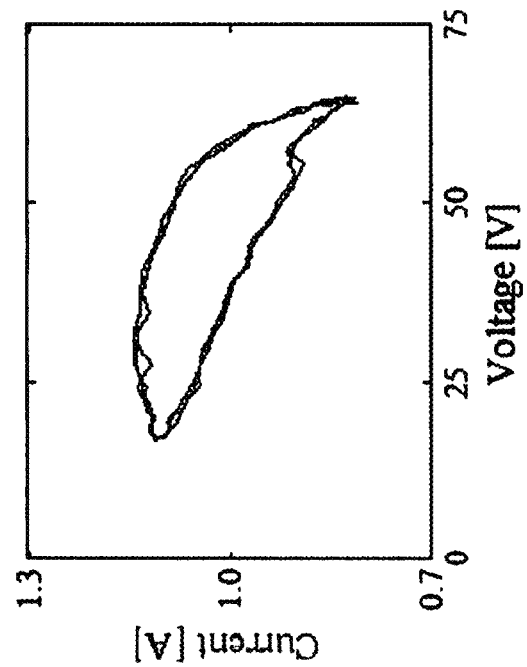
FIG. 14B is a graph showing the measured dynamic current-voltage (I-V) response of the first PV panel in FIG. 13A.
Figure 14A:
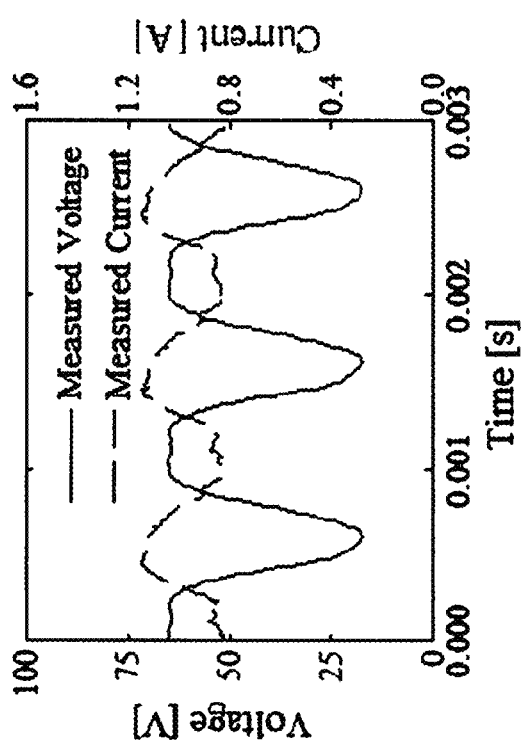
FIG. 14A is a graph showing measured voltage and current of the first PV panel in FIG. 13A.

An example of data acquired by data acquisition devices for PV panel $P_1$ is plotted in FIG. 14A. By plotting the current samples against the terminal voltage samples in FIG. 14B, the hysteresis loop is revealed. 16 sets of experimental data similar to those in FIGS. 14A and 14B are obtained for PV panels $P_1$ to $P_4$ with the data acquisition devices module.

The diagnostic process is performed 10 times on each of the 16 sets of the acquired data per PV panel. The result is 160 sets of intrinsic parameters for every PV panel. The mean value μ and standard deviation σ is listed in Table VIII.

TABLE VIII

Intrinsic Parameter Identification by RJGGA

| | $P_1$ | | $P_2$ | | $P_3$ | | $P_4$ | |
|---|---|---|---|---|---|---|---|---|
| Parameter | μ | σ | μ | σ | μ | σ | μ | σ |
| $I_{ph}$ (A) | 1.21 | $8.10 \times 10^{-3}$ | 0.59 | $5.32 \times 10^{-3}$ | 0.45 | $7.14 \times 10^{-3}$ | 1.17 | 0.01 |
| $I_o$ (A) | $4.13 \times 10^{-6}$ | $4.32 \times 10^{-6}$ | $9.83 \times 10^{-10}$ | $2.46 \times 10^{-9}$ | $1.32 \times 10^{-2}$ | $1.56 \times 10^{-7}$ | $2.61 \times 10^{-6}$ | $3.11 \times 10^{-6}$ |
| $v_T$ (V) | 5.72 | 0.41 | 4.61 | 0.38 | 4.83 | 0.33 | 6.13 | 0.53 |
| $R_{sh}$ (Ω) | 265.98 | 16.09 | 332.49 | 21.14 | 524.84 | 35.01 | 412.02 | 32.61 |
| $C_{sh}$ (F) | $3.00 \times 10^{-7}$ | $4.27 \times 10^{-9}$ | $2.94 \times 10^{-2}$ | $1.49 \times 10^{-2}$ | $1.97 \times 10^{-2}$ | $5.43 \times 10^{-9}$ | $3.53 \times 10^{-2}$ | $8.69 \times 10^{-9}$ |
| $R_s$ (Ω) | 5.66 | 1.00 | 7.99 | 1.75 | 10.75 | 1.69 | 8.82 | 1.64 |
| $f_{obj}$ (—) | $8.45 \times 10^{-4}$ | $1.10 \times 10^{-4}$ | $3.19 \times 10^{-4}$ | $4.24 \times 10^{-5}$ | $7.65 \times 10^{-5}$ | $9.43 \times 10^{-6}$ | $3.31 \times 10^{-4}$ | $3.02 \times 10^{-5}$ |

TABLE V

Components for DAM

| Part | Manufacturer | Model number | Specification |
|---|---|---|---|
| Microcontroller | STM | STM32F405RG | 168 MHz, 12-bit ADC |
| Op-Amp (V) | TI | INA826AIDR | 1 MHz, 100 dB |
| Op-Amp (I) | TI | INA240A1 | 400 KHz, 120 dB |
| MOSFET | STM | STP26NM60N | 600 V VDS |
| Inductor | Eaton | CTX150-5-52 | 150 μH, 7.7 A |
| Capacitor | Panasonic | ECQ-E6105KF | 1 μF, 630 VDC |
| Gate driver | Infineon | IR21108PBF | up to 500 V, 2 A |
| Wireless Mod. | NXP | MC1322V | ZigBee |

TABLE VI

Components for CM

| Part | Manufacturer | Model number | Specification |
|---|---|---|---|
| ARM-FPGA SoC | Terasic | DE0-nano-SOC | Cyclone V |
| Wireless Module | NXP | MC1322V | ZigBee |
| WIFI Module | Ai-Thinker | ESP8266MOD | D1 ESP8266 |

The standard deviation σ in Table VIII shows high confidence for averaged values of the parameters $I_{ph}$, $V_T$, $R_{sh}$, $C_{sh}$, and $R_s$. The $I_o$ exhibits large standard deviation σ, due to the nonlinearity of the diode $D_{sh}$ in the solar cell model. The RJGGA may produce outliers by misidentifying the $I_o$ in case the current through diode $i_D(t)$ is not exhibited enough in the measured data. In such case, the RJGGA identifies wider range of $I_o$ as fit solution, as the objective function is not able to reflect the difference.

As the verification results later show, the mean value of $I_o$ can be rectified by removing 10% of the values furthest from the mean. The rectified mean value μ for the parameter $I_o$ and the standard deviation σ are listed in Table IX.

To validate the intrinsic parameters identified by RJGGA, another set of measurements is realized for PV panel $P_1$ and $P_2$, representing healthy and damaged PV panel respectively. The measurements differ in perturbation frequency and peak-to-peak amplitude. They are used as the input for averaged solar cell model represented by mean values of intrinsic parameters listed in Table VIII and rectified value of $I_o$ listed in Table IX.

TABLE IX

Rectified Value of Parameter $I_o$

| | $P_1$ | | $P_2$ | |
|---|---|---|---|---|
| | μ | σ | μ | σ |
| $I_o$ | $2.99 \times 10^{-6}$ | $2.41 \times 10^{-6}$ | $4.51 \times 10^{-10}$ | $4.41 \times 10^{-10}$ |

Table X lists the value of objective function attained for verification measurements

TABLE X

Objective Function Value for Averaged Model Verification

| Measurement Settings | | Objective Function Value | |
| --- | --- | --- | --- |
| Frequency | Amplitude | $P_1$ | $P_2$ |
| 1 kHz | Regular | $10.05 \times 10^{-4}$ | $7.30 \times 10^{-4}$ |
| 1 kHz | Low | $7.46 \times 10^{-4}$ | $5.27 \times 10^{-4}$ |
| 500 Hz | Regular | $14.76 \times 10^{-4}$ | $6.36 \times 10^{-4}$ |
| 500 Hz | Low | $5.10 \times 10^{-4}$ | $7.38 \times 10^{-4}$ |

FIGS. 15A to 15D and 16A to 16D show the input terminal voltage and current and predicted current (following the measurement settings listed in Table X) for $P_1$ and $P_2$ respectively. Reversing the identification problem shows the diagnosed intrinsic PV panel parameters fully describe the tested PV panels. However, application of the averaged model to multiple different measurements under different settings would lead to some discrepancies, as expected. This is illustrated by comparing the value of objective function in Table VIII and Table X.

The above embodiments have provided a diagnostic system and method for photovoltaic solar farms, in particular, a system and method for determining a state or condition of a PV panel. The system and method utilizes non-invasive data acquisition by hardware based on DPP concepts. The stochastic algorithm RJGGA is employed on embedded platform, to demonstrate the practical implementation, providing diagnostics on-site at the photovoltaic solar plant. The system and method embodiments facilitate non-invasive, on-line data acquisition, and embedded application of CI methods, to provide effective and efficient diagnostics for PV panels.

The system in the above embodiments operates by acquiring the terminal voltage and current of the diagnosed PV panels under voltage perturbations. The perturbations are generated by attached device, at high frequency, lasting several or several tens of milliseconds. This prevents significant disruption to power generation process, rendering the data acquisition process transparent to regular operation of the photovoltaic solar plant. The diagnostics of the PV panel are formulated as optimization problem and solved by RJGGA on embedded platform. RJGGA is a non-elitist algorithm, with a reduced chance of being trapped into local optima. The outcome is a set of intrinsic parameters reporting the current state of the diagnosed PV panel. Relative comparison of these parameters over time reveals the undergoing degradation process and enables failure prediction and maintenance scheduling. Advantages of the system and method above are their discreet operation, practical applicability, scalability and potential to be integrated within DPP systems. The system and method also follows the trends of Industry 4.0, possibly augmenting existing solutions with advanced optimization techniques. This yields a multipurpose smart electronic system, not only generating power but self-diagnosing and forecasting its future development.

Figure 17:
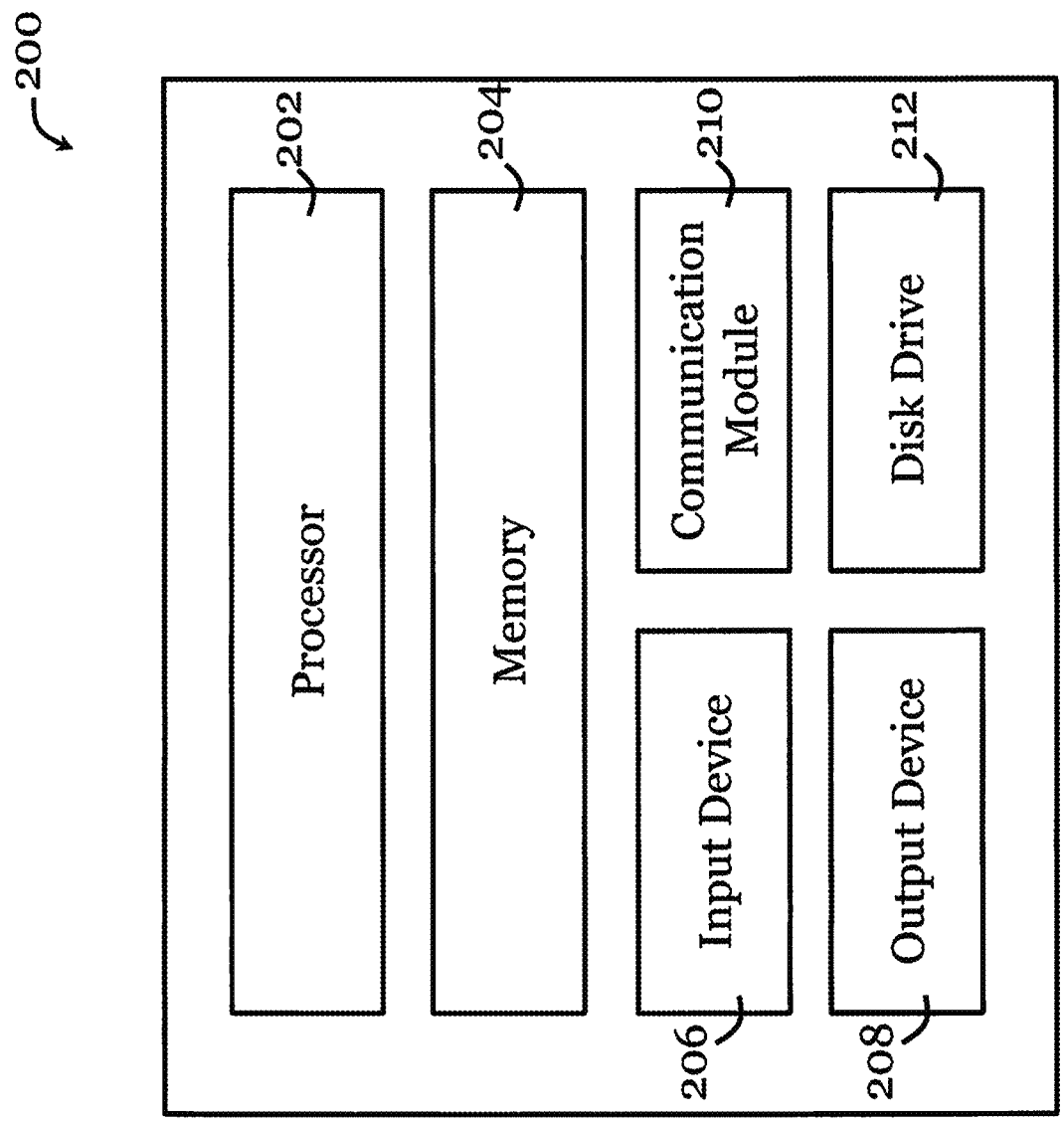
FIG. 17 is a block diagram of an exemplary information handling system arranged to implement at least part of the system in FIG. 1.

FIG. 17 shows a schematic diagram of exemplary information handling system 200 that can be used as a server or other information processing systems for implementing any part of the data acquisition device, any part of the control device, or any part of the storage. The information handling system 200 may have different configurations, and it generally comprises suitable components necessary to receive, store, and execute appropriate computer instructions, commands, or codes. The main components of the information handling system 200 are a processor 202 and a memory unit 204. The processor 202 may be formed by one or more CPU, MCU, controllers, logic circuits, Raspberry Pi chip, etc. The memory unit 204 may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. Preferably, the information handling system 200 further includes one or more input devices 206 such as a keyboard, a mouse, a stylus, an image scanner, a microphone, a tactile input device (e.g., touch sensitive screen), and an image/video input device (e.g., camera). The information handling system 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 200 may further include one or more disk drives 212 which may encompass solid state drives, hard disk drives, optical drives, flash drives, and/or magnetic tape drives. A suitable operating system may be installed in the information handling system 200, e.g., on the disk drive 212 or in the memory unit 204. The memory unit 204 and the disk drive 212 may be operated by the processor 202. The information handling system 200 also preferably includes a communication module 210 for establishing one or more communication links (not shown) with one or more other computing devices such as servers, personal computers, terminals, tablets, phones, or other wireless or handheld computing devices. The communication module 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 202, the memory unit 204, and optionally the input devices 206, the output devices 208, the communication module 210 and the disk drives 212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 200 shown in FIG. 17 is merely exemplary and different information handling systems 200 with different configurations may be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

It will be appreciated by persons skilled in the art that numerous variations and/or modifications may be made to the invention as shown in the specific embodiments without departing from the scope of the invention as defined in the claims. The described embodiments of the invention should therefore be considered in all respects as illustrative, not restrictive.

For example, in the system of FIG. 1, the number of data acquisition devices, control device, and storage may be different than the numbers shown. The system may include one control device for communicating with one or more data acquisition devices, or multiple control devices each for communicating with one or more respective data acquisition devices. The first communication link between the data acquisition device and the control device can be wired or wireless. Preferably, the first communication link is wireless, in the form of ZigBee, Bluetooth, NFC, RF, Wi-Fi, cellular, or the like. The second communication link between the control device and the storage can be wired or wireless. Preferably, the second communication link is also wireless, in the form of ZigBee, Bluetooth, NFC, RF, Wi-Fi, cellular, or the like. The communication between the data acquisition devices and the control device can occur periodically, intermittently or continuously. The communication between the control device and the storage can occur periodically, intermittently or continuously. The storage can alternatively be on-site, or implemented partly on-site and partly off-site. The control device can alternatively be off-site, or implemented partly on-site and partly off-site. The system of FIG. 1 can be used in other types of solar power plants.

The method of FIG. 2 can be modified. For example, the triggering of measurement may be initiated by the data acquisition devices. The analysis may be performed by one or more control devices. The data can be stored locally in the control devices. The step of communicating data to the storage may be omitted. The method may include further steps such as analyzing the time series of the intrinsic parameters to determine a past, present, or future state of the PV panels.

Various modifications can be made to the data acquisition devices, control devices, and the storage, without departing from the scope of the invention as defined by the claims. For example, the response signals need not be sampled for processing.

The invention claimed is:

1. A system for determining a state of a photovoltaic panel, comprising:
 a data acquisition device arranged to be connected across at least two series-connected photovoltaic panels, and a control device; wherein the data acquisition device comprises:
  a circuit arranged to, during normal operation of the photovoltaic panels, transmit excitation voltage signals, each having a respective non-zero perturbation frequency, to at least one of the at least two series-connected photovoltaic panels to establish a photovoltaic panel under test and detect terminal voltage signals and output current signals of the photovoltaic panel under test in response to the excitation voltage signals; and
  a communication module arranged to communicate with the control device to receive trigger signals from the control device to initiate transmission of the excitation voltage signals and to transmit the detected terminal voltage signals and output current signals to the control device for analysis and determination of a state of the photovoltaic panel under test; wherein the control device comprises:
  a communication module arranged to communicate with the data acquisition device;
  a processing unit arranged to process the detected terminal voltage signals and output current signals of the photovoltaic panel under test so as to determine a respective value of one or more intrinsic parameters indicative of the state of the photovoltaic panel under test, wherein the processing unit is arranged to process the detected terminal voltage signals and output current signals by matching the detected terminal voltage signals and output current signals of the photovoltaic panel under test with a predetermined circuit model, which defines a plurality of modeled circuit elements and a plurality of modeled circuit parameters associated with the modeled circuit elements, for determining respective values of the plurality of modeled circuit parameters corresponding to the detected terminal voltage signals and output current signals of the photovoltaic panel under test, wherein at least one of the determined values of the plurality of modeled circuit parameters represents a value of an intrinsic parameter indicative of the state of the photovoltaic panel under test; and
  a memory arranged to store computer instructions for processing the detected terminal voltage signals and output current signals based on the predetermined circuit model, wherein the computer instructions define the predetermined circuit model as a dynamic single-diode model of a solar cell; wherein the plurality of modeled circuit elements include:
  a modeled current source providing a modeled current based on modeled incident light;
  a modeled diode connected in parallel with the modeled current source;
  a modeled capacitor connected in parallel with the modeled current source;
  a modeled first resistor connected in parallel with the modeled current source; and
  a modeled second resistor connected in series with, respectively, the modeled first resistor and the modeled current source; and wherein the plurality of modeled circuit parameters comprise:
  a current Iph provide by the modeled current source in the dynamic single-diode model;
  a reverse saturation current Io in the dynamic single-diode model;
  a thermal voltage vT in the dynamic single-diode model;
  a resistance Rsh of the modeled first resistor in the dynamic single-diode model, indicative of an intrinsic p-n junction resistance associated with the photovoltaic panel under test;
  a capacitance Csh of the modeled capacitor in the dynamic single-diode model, indicative of an intrinsic p-n junction capacitance associated with the photovoltaic panel under test; and a resistance Rs of the modeled second resistor in the dynamic single-diode model.

2. The system of claim 1, wherein the excitation voltage signals are arranged to drive a terminal voltage of the photovoltaic panel under test from minimum voltage level to maximum voltage level as bounded by at least one of:

a current level of degradation or irradiation of the photovoltaic panel under test, and an operation point of a grid-tie inverter operably connected with the photovoltaic panel under test.

3. The system of claim 1, wherein the data acquisition device further includes a sampler for sampling the detected terminal voltage signals and output current signals to provide sampled detected response signals, and the communication module is arranged to communicate the sampled detected response signals to the control device.

4. The system of claim 1, wherein the data acquisition device includes a memory for storing the detected terminal voltage signals and output current signals.

5. The system of claim 1, wherein the circuit includes:
a power converter with two switches;
a driving circuit for providing gating signals to operate the two switches complementarily;
a controller for controlling the driving circuit based on a difference between the detected terminal voltage signals of the photovoltaic panel under test and reference voltage signals with non-zero perturbation frequency so as to control the detected terminal voltage signals of the photovoltaic panel under test to follow the reference voltage signals.

6. The system of claim 5, wherein the power converter comprises a DC-DC converter.

7. The system of claim 6, wherein the DC-DC converter comprises a buck-boost converter arranged to operate in continuous conduction mode.

8. The system of claim 5, wherein the power converter further comprises:
a first capacitor connected across a first photovoltaic panel of the at least two series-connected photovoltaic panels;
a second capacitor connected across a second photovoltaic panel of the at least two series-connected photovoltaic panels; and
an inductor connected across a node between the first and second capacitors and a node between the two switches.

9. The system of claim 1, wherein the communication module of the data acquisition device comprises a wireless communication module.

10. The system of claim 9, wherein the communication module of the control device comprises a wireless communication module.

11. The system of claim 10, wherein the communication module of the control device comprises a Zigbee communication module and the communication module of the data acquisition device comprises a Zigbee communication module.

12. The system of claim 1, wherein the processing unit includes:
a current predictor for predicting a terminal current modeled to be generated in the dynamic single-diode model based on the detected terminal voltage signals of the photovoltaic panel under test and values of the plurality of modeled circuit parameters; and
an optimization unit, operably connected with the current predictor, for determining one or more values of an objective function associated with the plurality of modeled circuit parameters using an optimization algorithm.

13. The system of claim 1, wherein the control device further comprises a further communication module for communicating the respective value of the one or more determined intrinsic parameters to a remote storage.

14. The system of claim 13, wherein the further communication module comprises a wireless communication module.

15. The system of claim 13, further comprising the remote storage arranged to store the respective value of the one or more intrinsic parameters determined by the control device.

16. The system of claim 15, wherein the remote storage comprises a server.

17. The system of claim 1, wherein each excitation voltage signal has a duration in the order of milliseconds.

18. The system of claim 1, wherein the data acquisition device is provided by a differential power processing device, the differential power processing device is operable in a normal mode to conduct maximum power point tracking and in a diagnostic mode to operate as the data acquisition device.

19. The system of claim 1, wherein the control device further comprises a memory storing computer instructions providing an algorithmic means for enabling the matching.

20. A method for determining a state of a photovoltaic panel, comprising:
receiving, at a data acquisition device arranged to be connected across at least two series-connected photovoltaic panels, trigger signals from a control device;
transmitting, using a circuit of the data acquisition device, excitation voltage signals, each having a respective non-zero perturbation frequency to at least one of the at least two series-connected photovoltaic panels to establish a photovoltaic panel under test during normal operation of the at least two series-connected photovoltaic panels;
detecting, using the circuit of the data acquisition device, terminal voltage signals and output current signals generated by the photovoltaic panel under test in response to the excitation signal;
communicating, using a communication module of the data acquisition device, the detected terminal voltage signals and output current signals to the control device for analysis and determination of a state of the photovoltaic panel under test;
processing the detected terminal voltage signals and output current signals of the photovoltaic panel under test to determine a respective value of one or more intrinsic parameters indicative of the state of the photovoltaic panel under test; and
matching the detected terminal voltage signals and output current signals of the photovoltaic panel under test with a predetermined circuit model which defines a plurality of modeled circuit elements and a plurality of modeled circuit parameters associated with the modeled circuit elements, for determining respective values of the plurality of modeled circuit parameters corresponding to the detected terminal voltage signals and output current signals of the photovoltaic panel under test, wherein at least one of the determined values of the plurality of modeled circuit parameters represents a value of an intrinsic parameter indicative of the state of the photovoltaic panel under test; wherein the predetermined circuit model comprises a dynamic single-diode model of a solar cell, and wherein the plurality of modeled circuit elements include:
- a modeled current source providing a modeled current based on modeled incident light;
- a modeled diode connected in parallel with the modeled current source;
- a modeled capacitor connected in parallel with the modeled current source;
- a modeled first resistor connected in parallel with the modeled current source; and
- a modeled second resistor connected in series with, respectively, the modeled first resistor and the modeled current source; and wherein the plurality of modeled circuit parameters comprise:
  - a current Iph provide by the modeled current source in the dynamic single-diode model;
  - a reverse saturation current Io in the dynamic single-diode model;
  - a thermal voltage vT in the dynamic single-diode model;
  - a resistance Rsh of the modeled first resistor in the dynamic single-diode model, indicative of an intrinsic p-n junction resistance associated with the photovoltaic panel under test;
  - a capacitance Csh of the modeled capacitor in the dynamic single-diode model, indicative of an intrinsic p-n junction capacitance associated with the photovoltaic panel under test; and
  - a resistance Rs of the modeled second resistor in the dynamic single-diode model.

21. The method of claim 20, further comprising:
sampling, using a sampler of the data acquisition device, the detected terminal voltage signals and output current signals to provide sampled detected response signals; and wherein the communicating step comprises communicating the sampled detected response signals to the control device.

22. The method of claim 21, further comprising:
storing the detected terminal voltage signals and output current signals.

23. The method of claim 20, wherein the step of matching comprises:
predicting a terminal current modeled to be generated in the dynamic single-diode model based on the detected terminal voltage signals of the photovoltaic panel under test and-values of the plurality of modeled circuit parameters; and determining, using an optimization algorithm, one or more values of an objective function associated with the plurality of modeled circuit parameters.

24. The method of claim 23, further comprising:
communicating the respective value of the one or more intrinsic parameters indicative of the state of the photovoltaic panel under test to a remote storage.

25. The method of claim 23, further comprising:
analyzing a time series of the values of the one or more intrinsic parameters to determine a predicted state of the photovoltaic panel under test.

26. A system for determining a state of a photovoltaic panel, comprising:
- a data acquisition device arranged to be connected across at least two series-connected photovoltaic panels, the data acquisition device having:
  - a circuit arranged to, during normal operation of the photovoltaic panels, transmit excitation voltage signals, each having a respective non-zero perturbation frequency, to at least one of the at least two series-connected photovoltaic panels to establish a photovoltaic panel under test and detect terminal voltage signals and output current signals of the photovoltaic panel under test in response to the excitation voltage signals; and
- a communication module arranged to communicate with a control device to receive trigger signals from the control device to initiate transmission of excitation voltage signals and to transmit the detected terminal voltage signals and output current signals to the control device for analysis and determination of a state of the photovoltaic panel under test; wherein the circuit includes:
  - a power converter comprising two switches;
  - a first capacitor connected across a first photovoltaic panel of the at least two series-connected photovoltaic panels;
  - a second capacitor connected across a second photovoltaic panel of the at least two series-connected photovoltaic panels;
  - an inductor connected across a node between the first and second capacitors and a node between the two switches;
  - a driving circuit for providing gating signals to operate the two switches complementarily; and
  - a controller for controlling the driving circuit based on a difference between the detected terminal voltage signals of the photovoltaic panel under test and a reference voltage signal with non-zero perturbation frequency so as to control the detected terminal voltage signals of the photovoltaic panel under test to follow the reference voltage signal.

* * * * *